(12) United States Patent
Hayashi et al.

(10) Patent No.: US 11,822,199 B2
(45) Date of Patent: Nov. 21, 2023

(54) LIQUID CRYSTAL DISPLAY DEVICE

(71) Applicant: Shanghai Tianma Micro-Electronics Co., Ltd., Shanghai (CN)

(72) Inventors: Hisashi Hayashi, Kanagawa (JP); Hidenori Ikeno, Kanagawa (JP)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 18/163,945

(22) Filed: Feb. 3, 2023

(65) Prior Publication Data

US 2023/0251538 A1    Aug. 10, 2023

(30) Foreign Application Priority Data

Feb. 10, 2022   (JP) .................................. 2022-019881

(51) Int. Cl.
  *G02F 1/1362*    (2006.01)
(52) U.S. Cl.
  CPC .. *G02F 1/136286* (2013.01); *G02F 1/136209* (2013.01)
(58) Field of Classification Search
  None
  See application file for complete search history.

(56) References Cited

U.S. PATENT DOCUMENTS

| | | |
|---|---|---|
| 2015/0206501 A1 | 7/2015 | Kurasawa et al. |
| 2018/0120659 A1 | 5/2018 | Kim et al. |
| 2020/0292894 A1 | 9/2020 | Liu et al. |

FOREIGN PATENT DOCUMENTS

| | | |
|---|---|---|
| JP | 2015-156009 A | 8/2015 |
| JP | 2018-072839 A | 5/2018 |
| JP | 2021-535415 A | 12/2021 |

*Primary Examiner* — Richard H Kim
(74) *Attorney, Agent, or Firm* — Sughrue Mion, PLLC

(57) ABSTRACT

A liquid crystal display device includes a first liquid crystal display panel and a second liquid crystal display panel. The second liquid crystal display panel includes a scanning wiring extending in a zig-zag in the predetermined first direction. A period of bending points of the scanning wiring corresponds to a predetermined number of the sub pixels of the first liquid crystal display panel. The predetermined number is greater that a number of colors of the sub pixels arranged in the predetermined first direction in one of the first main pixel of the first liquid crystal display panel, and is not a natural number multiple of the number of colors of the sub pixels repeatedly arranged along the predetermined first direction of the first liquid crystal display panel.

9 Claims, 17 Drawing Sheets

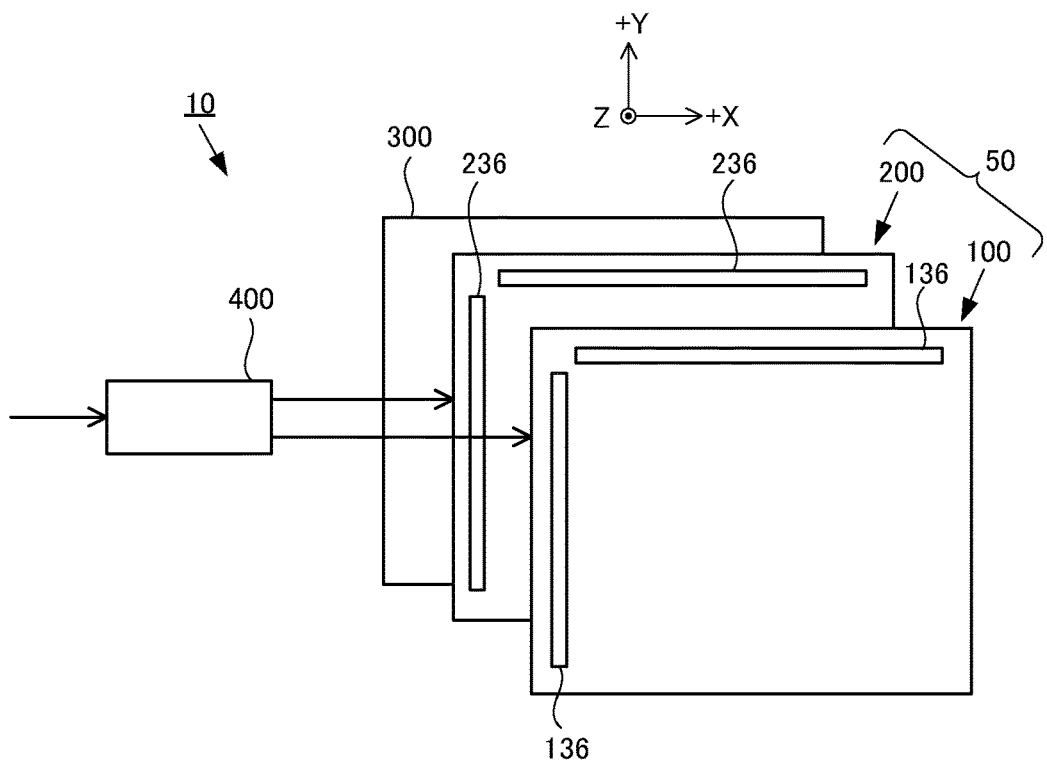
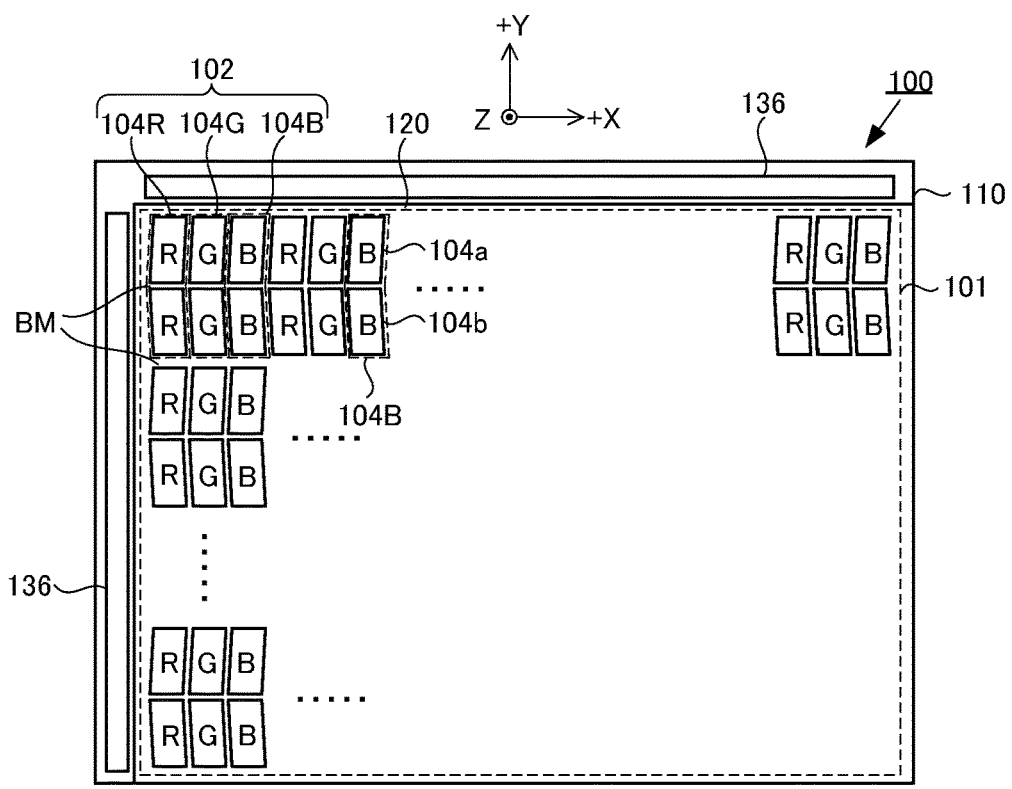

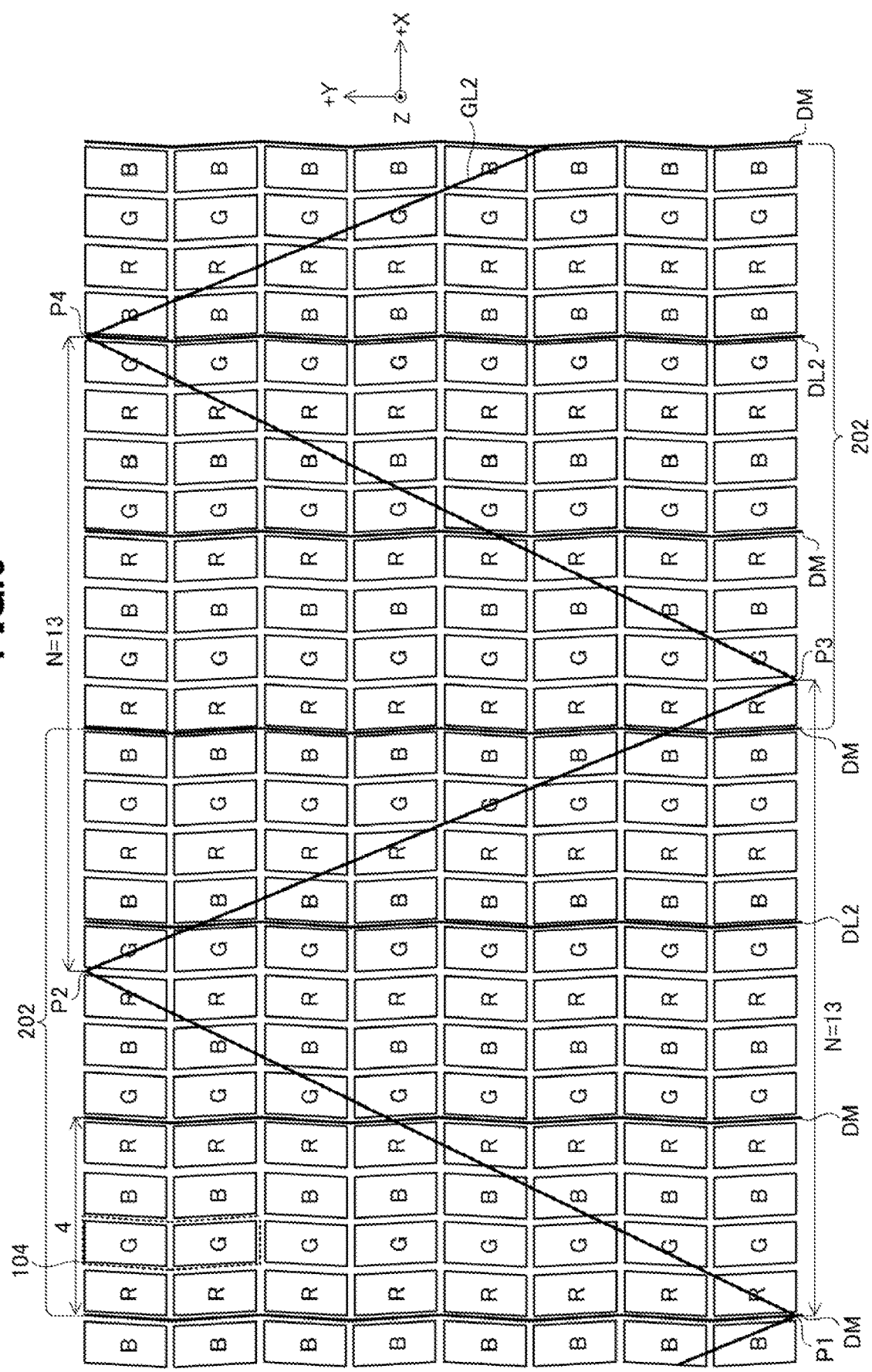

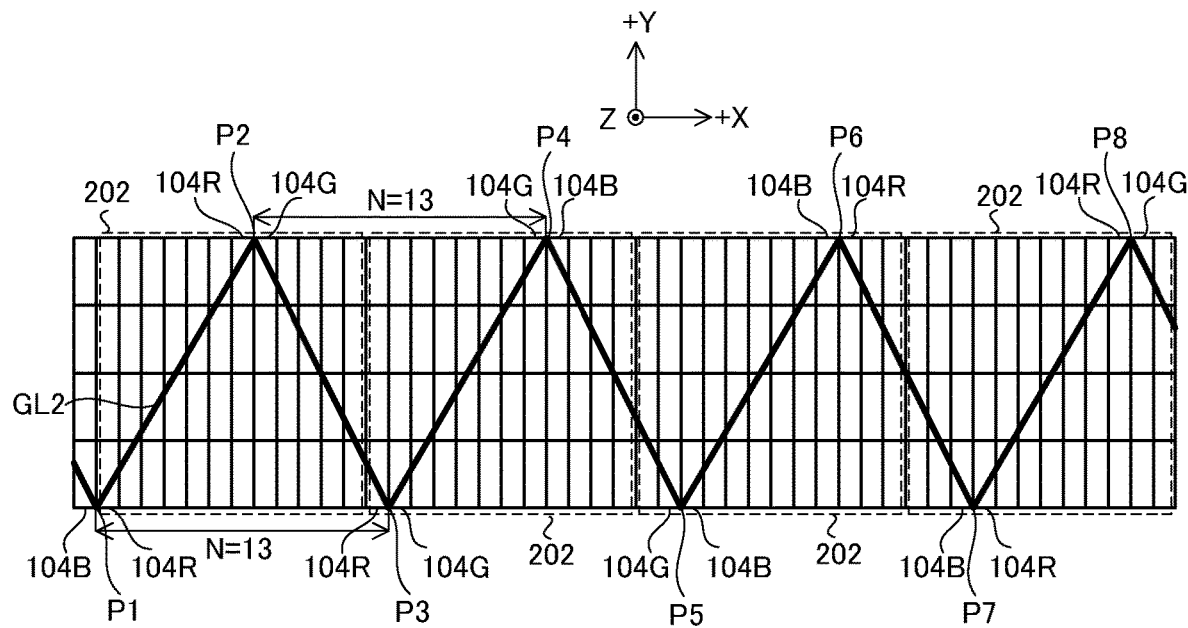
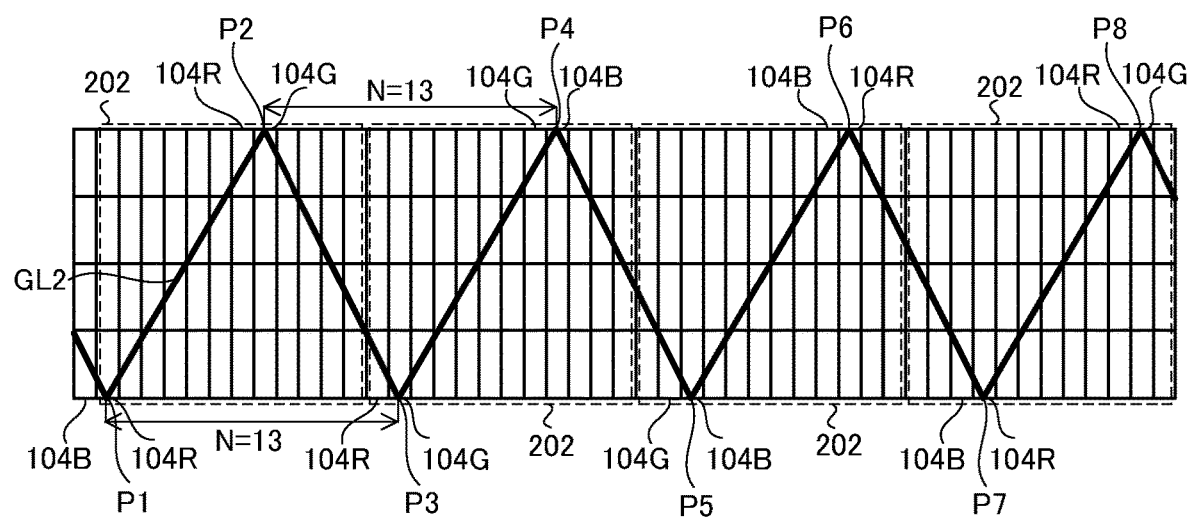

LIQUID CRYSTAL DISPLAY DEVICE

CROSS-REFERENCE TO RELATED APPLICATION

This application claims the benefit of Japanese Patent Application No. 2022-019881, filed on Feb. 10, 2022, the entire disclosure of which is incorporated by reference herein.

FIELD

The present disclosure relates generally to a liquid crystal display device.

BACKGROUND

In the related art, liquid crystal display devices are known in which a plurality of liquid crystal display panels are stacked to improve contrast. For example, Unexamined Japanese Patent Application Publication (Translation of PCT Application) No. 2021-535415 describes a display panel that includes a display liquid crystal panel and a light control panel that are stacked.

In Unexamined Japanese Patent Application Publication (Translation of PCT Application) No. 2021-535415, the display liquid crystal panel realizes a display function, and the light control panel controls the light that enters the display liquid crystal panel from a back light. The light control panel includes a plurality of signal lines (gate lines and data lines). At least a portion of the signal lines of the light control panel are polygonal lines.

In Unexamined Japanese Patent Application Publication (Translation of PCT Application) No. 2021-535415, the signal lines of the light control panel are configured as polygonal lines and, as such, the signal lines of the light control panel and the grid lines (gate lines and data lines) of the display liquid crystal panel are formed in different patterns. As a result, the moire of the display panel is improved. However, the bending points of the polygonal lines of the light control panel that broadly block the light from the back light are positioned between pixels of specific colors of the liquid crystal display panel (for example, between green pixels and blue pixels). Since the bending points of the polygonal lines of the light control panel periodically block the light entering the pixels of specific colors of the liquid crystal display panel, the brightness of the pixels of specific colors may decrease, and color moire may occur in the display panel.

SUMMARY

A liquid crystal display device according to a first aspect of the present disclosure includes:
 a first liquid crystal display panel that displays a color image and in which a first main pixel is disposed in a matrix in a predetermined first direction and in a predetermined second direction perpendicular to the predetermined first direction, the first main pixel including a plurality of sub pixels of different colors; and
 a second liquid crystal display panel that displays a monochrome image, is positioned on a side, opposite a surface of an observer side, of the first liquid crystal display panel so as to overlap the first liquid crystal display panel, and in which a second main pixel is disposed in a matrix in the predetermined first direction and in the predetermined second direction, wherein
 the second liquid crystal display panel includes a scanning wiring extending in a zig-zig in the predetermined first direction,
 a period of bending points, arranged along the predetermined first direction, of the scanning wiring of the second liquid crystal display panel corresponds to a predetermined number of the sub pixels of the first liquid crystal display panel, and
 the predetermined number is greater that a number of colors of the sub pixels arranged in the predetermined first direction in one of the first main pixel of the first liquid crystal display panel, and is not a natural number multiple of the number of colors of the sub pixels repeatedly arranged along the predetermined first direction of the first liquid crystal display panel.

It is to be understood that both the foregoing general description and the following detailed description are exemplary and explanatory and are not restrictive of this disclosure.

BRIEF DESCRIPTION OF THE DRAWINGS

A more complete understanding of this application can be obtained when the following detailed description is considered in conjunction with the following drawings, in which:

FIG. 1 is a schematic drawing illustrating a liquid crystal display device according to Embodiment 1;

FIG. 2 is a plan view illustrating a first liquid crystal display panel according to Embodiment 1;

FIG. 6 is a schematic drawing illustrating second scanning wirings, second signal wirings, dummy lines, and sub pixels of the first liquid crystal display panel in two second main pixels, viewed from the front, according to Embodiment 1;

FIG. 7 is a schematic drawing illustrating one of the second scanning wirings and the sub pixels of the first liquid crystal display panel in four second main pixels, viewed from the front, according to Embodiment 1;

FIG. 8 is a schematic drawing illustrating one of the second scanning wirings and the sub pixels of the first liquid crystal display panel in four second main pixels, viewed from a position closer to a −X side from the front, according to Embodiment 1;

FIG. 10 is a plan view illustrating a second scanning wiring, a second signal wiring, a switching element, and the like;

DETAILED DESCRIPTION

Figure 3:
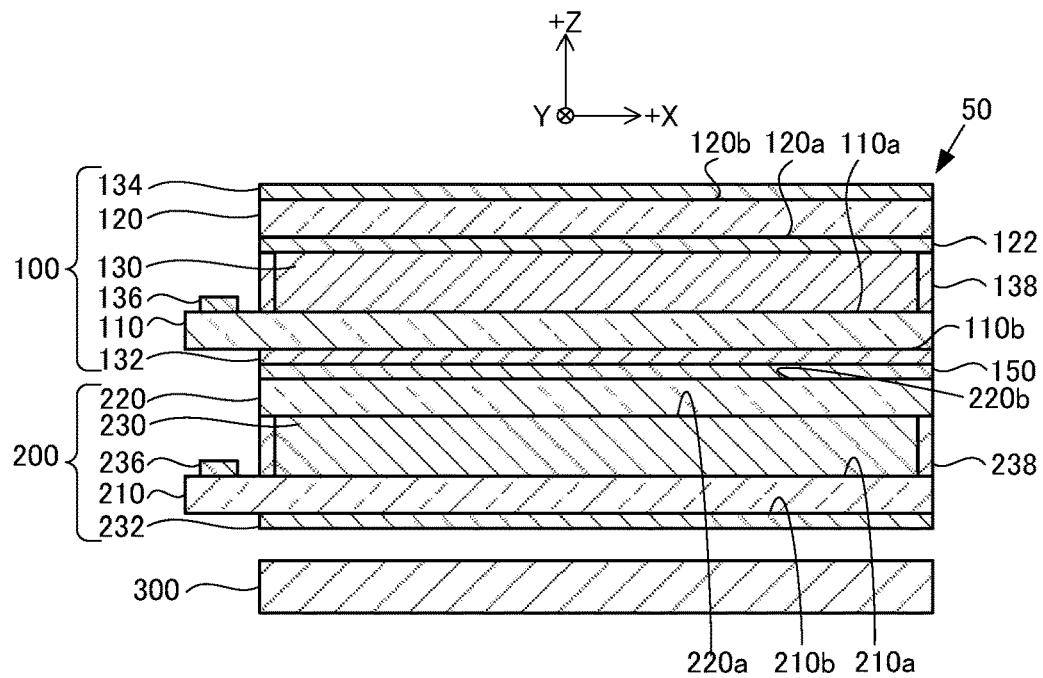
FIG. 3 is a cross-sectional view illustrating the liquid crystal display device according to Embodiment 1.

Hereinafter, a liquid crystal display device according to various embodiments is described while referencing the drawings.

Embodiment 1

A liquid crystal display device 10 according to the present embodiment is described while referencing FIGS. 1 to 13. The liquid crystal display device 10 displays a color image using a first liquid crystal display panel 100 and a second liquid crystal display panel 200, described later.

As illustrated in FIG. 1, the liquid crystal display device 10 includes a panel section 50, a back light 300, and a display controller 400. The panel section 50 includes the first liquid crystal display panel 100 and the second liquid crystal display panel 200. The back light 300 is a light source that emits light on the first liquid crystal display panel 100 and the second liquid crystal display panel 200. The display controller 400 controls the displays of the first liquid crystal display panel 100 and the second liquid crystal display panel 200. Note that, in the present description, to facilitate comprehension, in the liquid crystal display device of FIG. 1, the right direction (the right direction on paper) is referred to as the "+X direction", the up direction (the up direction on paper) is referred to as the "+Y direction", and the direction perpendicular to the +X direction and the +Y direction (the front direction on paper) is referred to as the "+Z direction." Additionally, the X direction corresponds to a predetermined first direction, and the Y direction corresponds to a predetermined second direction, Panel Section The panel section 50 includes the first liquid crystal display panel 100 and the second liquid crystal display panel 200. The first liquid crystal display panel 100 is positioned on an observer side (the +Z side). The first liquid crystal display panel 100 displays a color image. The second liquid crystal display panel 200 is positioned on a side, opposite the surface of the observer side, of the first liquid crystal display panel 100 (a back surface side of the first liquid crystal display panel 100), and overlaps the first liquid crystal display panel 100. The second liquid crystal display panel 200 displays a monochrome image.

In one example, the first liquid crystal display panel 100 is implemented as a known transmissive horizontal electric field type liquid crystal display panel. The first liquid crystal display panel 100 is active matrix driven by thin film transistors (TFT).

As illustrated in FIG. 2, the first liquid crystal display panel 100 includes, in a rectangular display region 101, first main pixels 102 arranged in a matrix in the X direction and the Y direction. The first main pixels 102 are formed from a red pixel 104R that emits red light, a green pixel 104G that emits green light, and a blue pixel 104B that emits blue light that are defined in a V-shape by a black matrix BM and that are arranged in the X direction. The red pixel 104R, the green pixel 104G, and the blue pixel 104B are divided into two domains 104a, 104b in which the rotation direction of a first liquid crystal 130 is different. The domain 104a and the domain 104b are also defined by the black matrix BM. Note that the red pixel 104R, the green pixel 104G, the blue pixel 104B, and a hereinafter described white pixel 104W may be referred to collectively as "sub pixels 104."

As illustrated in FIG. 2, in the present embodiment, the first main pixels 102 are arranged in the X direction (the predetermined first direction) and the Y direction (the predetermined second direction), and the red pixel 104R, the green pixel 104G, and the blue pixel 104B of the first main pixels 102 are arranged in the X direction. As such, in one of the first main pixels 102, the number of colors of the sub pixels 104 arranged in the X direction is three. The number of colors of the sub pixels 104 repeatedly arranged along the X direction is also three.

As illustrated in FIG. 3, the first liquid crystal display panel 100 includes a first TFT substrate 110, a first counter substrate 120, a first liquid crystal 130, a first polarizing plate 132, a second polarizing plate 134, and a first driver circuit 136. The first TFT substrate 110 and the first counter substrate 120 sandwich the first liquid crystal 130. The first polarizing plate 132 is provided on the first TFT substrate 110. The second polarizing plate 134 is provided on the first counter substrate 120.

In one example, the first TFT substrate 110 is implemented as a glass substrate. TFTs for selecting the sub pixels 104, common electrodes, pixel electrodes, an alignment film for aligning the first liquid crystal 130, and the like (all not illustrated in the drawings) are provided on a main surface 110a on the first liquid crystal 130 side of the first TFT substrate 110.

Figure 4:
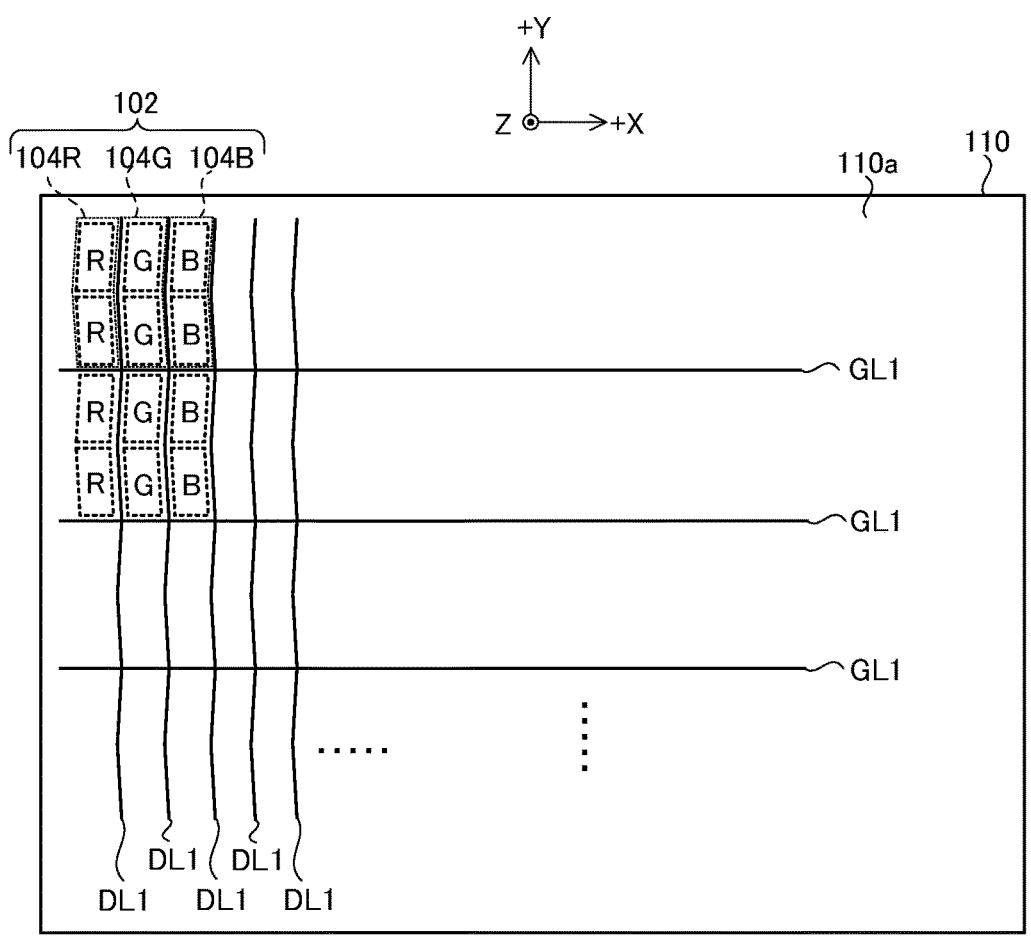
FIG. 4 is a schematic drawing illustrating first scanning wirings and first signal wirings of the first liquid crystal display panel according to Embodiment 1.

Furthermore, a plurality of common wirings (not illustrated), a plurality of first scanning wirings GL1, and a plurality of first signal wirings DL1 are formed on the main surface 110a of the first TFT substrate 110. The common wirings supply common potential to the common electrodes that apply voltage to the first liquid crystal 130. As illustrated in FIG. 4, the first scanning wirings GL1 extend linearly in the X direction, and supply voltage that causes the TFTs to operate. The first signal wirings DL1 extend in the Y direction, in zig-zags along the outer shape (V shape) of the sub pixels 104. The first signal wirings DL1 supply voltage, via the TFTs, to pixel electrodes that apply voltage to the first liquid crystal 130. The sub pixels 104 are surrounded by the first scanning wirings GL1 and the first signal wirings DL1, and the TFTs are provided at intersections of the first scanning wirings GL1 and the first signal wirings DL1. As illustrated in FIG. 3, the first polarizing plate 132 is provided on a main surface 110b of the first TFT substrate 110, on the side opposite the main surface 110a. Note that, in FIG. 4, the first scanning wirings GL1 and the first signal wirings DL1 are illustrated as solid lines. In the following drawings, the first scanning wirings GL1 and the first signal wirings DL1 may be illustrated as solid lines or broken lines.

As illustrated in FIG. 3, the first counter substrate 120 opposes the first TFT substrate 110. The first counter substrate 120 is adhered to the first TFT substrate 110 by a seal material 138. In one example, the first counter substrate 120 is implemented as a glass substrate. A color filter 122, the black matrix BM, an alignment film for aligning the first liquid crystal 130, and the like are provided on a main surface 120a on the first liquid crystal 130 side of the first counter substrate 120. The second polarizing plate 134 is provided on a main surface 120b of the first counter substrate 120, on the side opposite the main surface 120a. Note that, to facilitate comprehension, the black matrix BM, the alignment film, and the like are omitted from FIG. 3.

The color filter 122 is implemented as a striped color filter in which color filters of the same color are disposed in the Y direction. A red color filter, a green color filter, and a blue color filter of the color filter 122 are each surrounded by the black matrix BM, and respectively correspond to the red pixel 104R, the green pixel 104G, and the blue pixel 104B.

As illustrated in FIG. 2, the black matrix BM defines the first main pixels 102, the sub pixels 104, and the domains 104a, 104b. The black matrix BM covers the first scanning wirings GL1 and the first signal wirings DL1. Line segments, extending in the X direction, of the black matrix BM extend linearly, similar to the first scanning wirings GL1. Line segments, extending in the Y direction, of the black matrix BM extend in zig-zags having the same shape as the first signal wirings DL1.

As illustrated in FIG. 3, the first liquid crystal 130 is sandwiched between the first TFT substrate 110 and the first counter substrate 120. In one example, the first liquid crystal 130 is implemented as a positive nematic liquid crystal. The first liquid crystal 130 is initially aligned, by the alignment film, in a direction parallel to the main surface 110a of the first TFT substrate 110. Additionally, the first liquid crystal 130 rotates in a plane parallel to the main surface 110a of the first TFT substrate 110 due to voltage being applied.

The first polarizing plate 132 is provided on the main surface 110b of the first TFT substrate 110. The second polarizing plate 134 is provided on the main surface 120b of the first counter substrate 120. One transmittance axis of the transmittance axis of the first polarizing plate 132 and the transmittance axis of the second polarizing plate 134 is arranged parallel to the initial alignment direction of the first liquid crystal 130. The transmittance axis of the first polarizing plate 132 and the transmittance axis of the second polarizing plate 134 are orthogonal to each other. The first polarizing plate 132 is adhered, by a light-transmitting adhesive layer 150, to a hereinafter described second counter substrate 220 of the second liquid crystal display panel 200.

In one example, the adhesive layer 150 is implemented as an optical clear adhesive (OCA).

The first driver circuit 136 is provided on the main surface 110a of the first TFT substrate 110. The first driver circuit 136 supplies, on the basis of a color image signal supplied from the display controller 400, voltage to the first scanning wirings GL1, the first signal wirings DL1, and the common wirings.

Second Liquid Crystal Display Panel

As illustrated in FIG. 3, the second liquid crystal display panel 200 is positioned on a back surface side (−Z side) of the first liquid crystal display panel 100 and is adhered to the first liquid crystal display panel 100 by the adhesive layer 150. The second liquid crystal display panel 200 displays a monochrome image.

Figure 5:
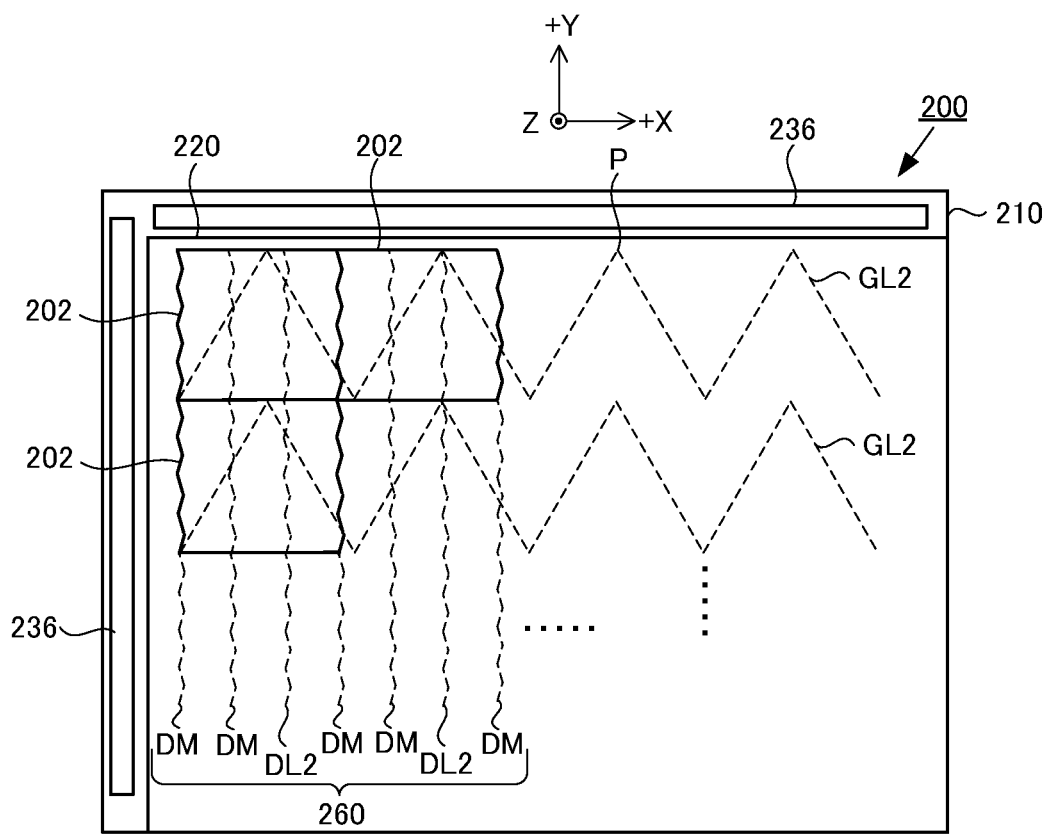
FIG. 5 is a plan view illustrating a second liquid crystal display panel according to Embodiment 1.

In the present embodiment, the second liquid crystal display panel 200 is implemented as a transmissive horizontal electric field type liquid crystal display panel that uses positive liquid crystal. The second liquid crystal display panel 200 is active matrix driven by hereinafter described switching elements 240. As illustrated in FIG. 5, the second liquid crystal display panel 200 includes second main pixels 202 arranged in a matrix in the X direction and the Y direction. In the present embodiment, one of the second main pixels 202 of the second liquid crystal display panel 200 corresponds to 16 (four in the X direction and four in the Y direction) of the first main pixels 102 of the first liquid crystal display panel 100, and one of the second main pixels 202 of the second liquid crystal display panel 200 emits light on 16 of the first main pixels 102 of the first liquid crystal display panel 100.

As illustrated in FIG. 3, the second liquid crystal display panel 200 includes a second TFT substrate 210, a second counter substrate 220, a second liquid crystal 230, a third polarizing plate 232, and a second driver circuit 236. The second TFT substrate 210 and the second counter substrate 220 sandwich the second liquid crystal 230. The third polarizing plate 232 is provided on the second TFT substrate 210. Note that, in the present embodiment, the first polarizing plate 132 of the first liquid crystal display panel 100 also serves as a polarizing plate on the light emission side of the second liquid crystal display panel 200. Additionally, note that the second liquid crystal display panel 200 is not provided with a color filter and a black matrix.

In one example, the second TFT substrate 210 is implemented as a glass substrate. A plurality of second scanning wirings GL2; a plurality of second signal wirings DL2; a plurality of dummy lines DM; common wirings (not illustrated); switching elements 240, pixel electrodes 250, and common electrodes CE of the second main pixels 202; an alignment film (not illustrated) for aligning the second liquid crystal 230; and the like are formed on a main surface 210a of the second liquid crystal 230 side of the second TFT substrate 210. The common wirings supply common potential to the common electrodes CE that apply voltage to the second liquid crystal 230. The second scanning wirings GL2 supply voltage that causes the switching elements 240 to operate. The second signal wirings DL2 supply voltage, via the switching elements 240, to pixel electrodes 250 that apply voltage to the second liquid crystal 230. The dummy lines DM are formed from a material that blocks light that enters from the back light 300. The dummy lines DM and the second signal wirings DL2 form a hereinafter described first light blocking pattern 260. The third polarizing plate 232 is provided on a main surface 210b of the second TFT substrate 210, on the side opposite the main surface 210a. Configurations of the second scanning wirings GL2, the second signal wirings DL2, the dummy lines DM, the second main pixels 202 (the switching elements 240, the common electrodes CE, and the pixel electrodes 250), and the like are described later.

The second counter substrate 220 opposes the second TFT substrate 210. The second counter substrate 220 is adhered to the second TFT substrate 210 by a seal material 238. In one example, the second counter substrate 220 is implemented as a glass substrate. An alignment film (not illustrated) for aligning the second liquid crystal 230 is provided on a main surface 220a on the second liquid crystal 230 side of the second counter substrate 220. The adhesive layer 150 is provided on a main surface 220b of the second counter substrate 220, on the side opposite the main surface 220a. The second counter substrate 220 is adhered to the first liquid crystal display panel 100 (the first polarizing plate 132) via the adhesive layer 150.

The second liquid crystal 230 is sandwiched between the second TFT substrate 210 and the second counter substrate 220. The second liquid crystal 230 is implemented as a positive-type nematic liquid crystal. The second liquid crystal 230 is initially aligned in the Y direction by the alignment film. The second liquid crystal 230 rotates in a plane parallel to the main surface 210a of the second TFT substrate 210 due to voltage being applied.

The third polarizing plate 232 is provided on the main surface 210b of the second TFT substrate 210. A transmittance axis of the third polarizing plate 232 is arranged parallel to the initial alignment direction of the second liquid crystal 230. Note that the transmittance axis of the third polarizing plate 232 and the transmittance axis of the first polarizing plate 132 (polarizing plate on the light emission side of the second liquid crystal display panel 200) of the first liquid crystal display panel 100 are orthogonal to each other, and the second liquid crystal display panel 200 operates in a normally black mode.

The second driver circuit 236 is provided on the main surface 210a of the second TFT substrate 210. The second driver circuit 236 supplies, on the basis of a signal supplied from the display controller 400, voltage to the second scanning wirings GL2, the second signal wirings DL2, and the common wirings.

Next, the second scanning wirings GL2, the second signal wirings DL2, and the dummy lines DM are described while referencing FIGS. 5 to 9. FIG. 6 illustrates one of the second scanning wirings GL2, the second signal wirings DL2, the dummy lines DM, and the sub pixels 104 of the first liquid crystal display panel 100 in two second main pixels 202, viewed from the front. FIG. 7 illustrates one of the second scanning wirings GL2, and the sub pixels 104 of the first liquid crystal display panel 100 in four of the second main pixels 202. In FIG. 7 and the following drawings, to facilitate comprehension, one sub pixel 104 of the first liquid crystal display panel 100 may be illustrated as one rectangle. Additionally, in the following drawings, due to the sub pixels 104 being illustrated as rectangles, the bent second signal wirings DL2 may be illustrated as straight line segments. Furthermore, hereinafter described bending points P1 to P10 of the second scanning wirings GL2 may be collectively referred to as bending points P.

Next, the relationship between the second scanning wirings GL2 and the sub pixels 104 of the first liquid crystal display panel 100 is described. As illustrated in FIGS. 5 and 6, the second scanning wirings GL2 pass through the insides of the second main pixels 202. The second scanning wirings GL2 bend at a +Y side end and a −Y side end of the second main pixels 202, and extend in a zig-zag in the X direction.

In the present embodiment, when viewing the liquid crystal display device 10 from the front (that is, when viewing from the +Z direction), the bending points P of the second scanning wirings GL2 are positioned inside the second main pixels 202, between the sub pixels 104 of the first liquid crystal display panel 100, as illustrated in FIG. 6.

The bending points P of the second scanning wirings GL2 are arranged along the X direction (the predetermined first direction) at a period corresponding to a predetermined number N of the sub pixels 104 of the first liquid crystal display panel 100. The predetermined number N is greater than the number of colors (three) of the sub pixels 104 arranged in the X direction in one of the first main pixels 102 of the first liquid crystal display panel 100, and is not a natural number multiple of the number of colors (three) of the sub pixels 104 repeatedly arranged along the X direction of the first liquid crystal display panel 100. Additionally, when the natural number is n and a real number is m, the predetermined number N is expressed by equations (1) and (2) below. In the present embodiment, as illustrated in FIGS. 6 and 7, a case is described in which the predetermined number N is 13 (n=4, m=1).

$$N = 3 \times n + m \tag{1}$$

$$0 < m < 3 \tag{2}$$

As illustrated in FIG. 7, in the present embodiment, the second scanning wirings GL2 extend an amount corresponding to six or seven of the sub pixels 104 (for example, seven between the bending point P1 and the bending point P2, and six between the bending point P2 and the bending point P3) and bend, and the bending points P1, P3, P5, and P7 arranged along the X direction and the bending points P2, P4, P6, and P8 arranged along the X direction are each arranged at a period corresponding to 13 of the sub pixels 104. In the arrangement of the bending points P1 to P7, the period corresponds to 13 of the sub pixels 104 and, as such, when the bending point P1 is positioned between the blue pixel 104B and the red pixel 104R, the bending point P3 is positioned between the red pixel 104R and the green pixel 104G, the bending point P5 is positioned between the green pixel 104G and the blue pixel 104B, and the bending point P7 is positioned between the blue pixel 104B and the red pixel 104R. In the arrangement of the bending points P2 to P8, the bending point P2 is positioned between the red pixel 104R and the green pixel 104G, the bending point P4 is positioned between the green pixel 104G and the blue pixel 104B, the bending point P6 is positioned between the blue pixel 104B and the red pixel 104R, and the bending point P8 is positioned between the red pixel 104R and the green pixel 104G.

That is, in the present embodiment, the color, of the sub pixels 104 sandwiching the bending points P arranged in the X direction, successively changes. The bending points P block the light entering the sub pixels 104 of the first liquid crystal display panel 100 from the back light 300 and, as such, the color, of the sub pixels 104 for which the entering light is blocked by the bending points P, successively changes.

When the color, of the sub pixels 104 for which the entering light is blocked by the bending points P, successively changes, decreases in the brightness of the color of the sub pixels 104 caused by the blocking of the entering light (color bias resulting from color mixing) are averaged across the display region 101 of the first liquid crystal display panel 100. As a result, color moire of the liquid crystal display device 10 can be suppressed.

Figure 9:
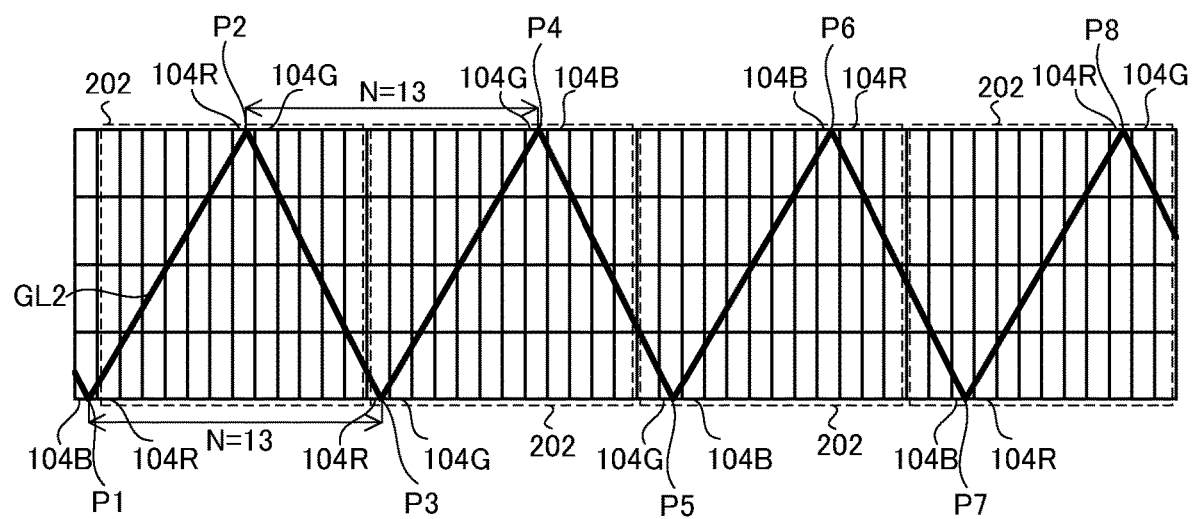
FIG. 9 is a schematic drawing illustrating one of the second scanning wirings and the sub pixels of the first liquid crystal display panel in four second main pixels, viewed from a position closer to a +X side from the front, according to Embodiment 1.

Additionally, in the present embodiment, as illustrated in FIG. 8, even when viewing the liquid crystal display device 10 from a position closer to the −X side from the front, the positions of the bending points P change uniformly from when viewed from the front and, as such, the color, of the sub pixels 104 sandwiching the bending points P arranged in the X direction, successively changes. Furthermore, as illustrated in FIG. 9, even when viewing the liquid crystal display device 10 from a position closer to the +X side from the front, the color, of the sub pixels 104 sandwiching the bending points P arranged in the X direction, successively changes. Accordingly, color moire of the liquid crystal display device can be suppressed even when the position of the observer changes.

Next, the relationship between the sub pixels 104 of the first liquid crystal display panel 100, and the second signal wirings DL2 and the dummy lines DM is described. When viewing the liquid crystal display device 10 from the front, as illustrated in FIG. 6, the second signal wirings DL2 are positioned between the sub pixels 104 of the first liquid crystal display panel 100, and extend in the Y direction while bending along the outer shape of the sub pixels 104 of the first liquid crystal display panel 100. Additionally, the second signal wirings DL2 overlap the first signal wirings DL1 of the first liquid crystal display panel 100. Similar to the second signal wirings DL2, the dummy lines DM also are positioned between the sub pixels 104 of the first liquid crystal display panel 100, and extend in the Y direction while bending along the outer shape of the sub pixels 104 of the first liquid crystal display panel 100. The dummy lines DM also overlap the first signal wirings DL1 of the first liquid crystal display panel 100.

In the present embodiment, as illustrated in FIG. 5, two of the dummy lines DM are disposed between two of the second signal wirings DL2, and the second signal wirings DL2 and the dummy lines DM form a first light blocking pattern 260 that blocks light entering from the back light 300. When viewing the liquid crystal display device 10 from the front, as illustrated in FIG. 6, the second signal wirings DL2 and the dummy lines DM (that is, the first light blocking pattern 260) are disposed every four of the sub pixels 104, four being one greater than the number of colors (three) of the sub pixels 104 repeatedly arranged along the X direction.

In the present embodiment, one of the second main pixels 202 of the second liquid crystal display panel 200 corresponds to 16 of the first main pixels 102 of the first liquid crystal display panel 100, and is larger than one of the first main pixels 102 of the first liquid crystal display panel 100. Accordingly, when only one of the second signal wirings DL2 corresponding to one of the second main pixels 202 is disposed as a wiring that has light blocking properties and extends in the Y direction, the spatial frequency of the dark lines, formed from the wirings that have light blocking properties and that extend in the Y direction, decreases, and dark lines are more likely to be recognized by the observer. In the present embodiment, when viewing the liquid crystal display device 10 from the front, the second signal wirings DL2 and the dummy lines DM forming the first light blocking pattern 260 are disposed every four of the sub pixels 104 of the first liquid crystal display panel 100 and, as such, the spatial frequency of the dark lines, formed from the wirings that have light blocking properties and that extend in the Y direction, can be increased, and the dark lines can be made more difficult for the observer to recognize.

Figure 10:
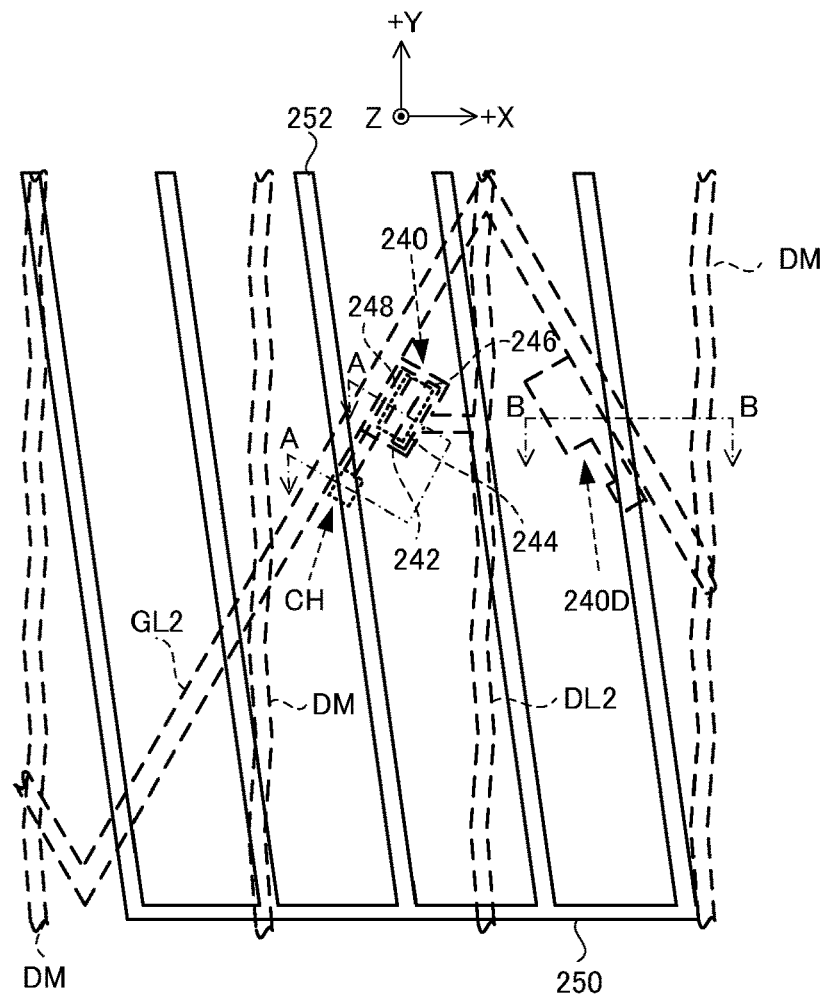
Figure 11:
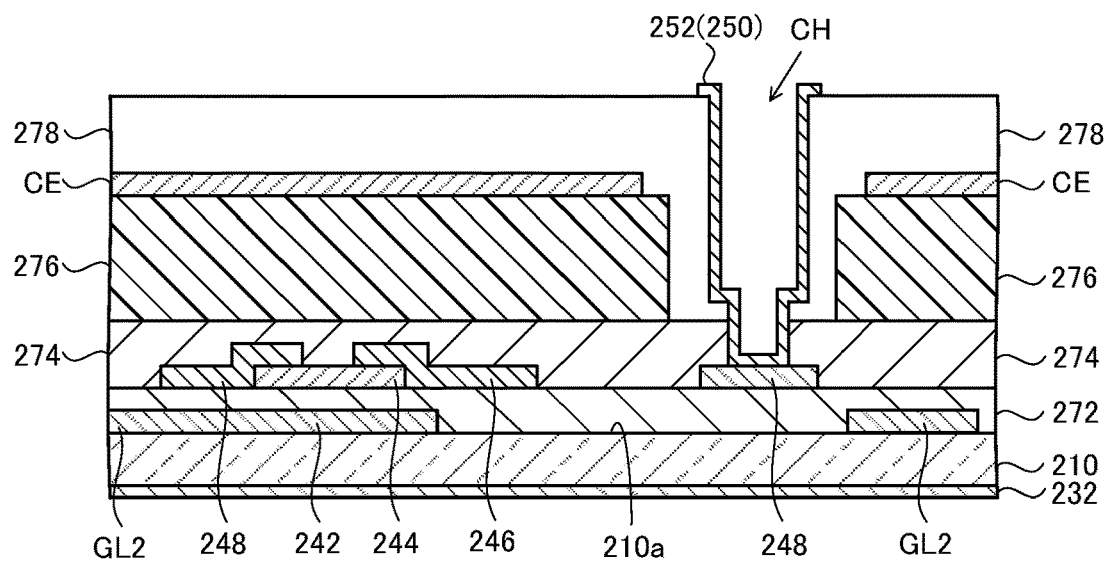
FIG. 11 is a cross-sectional view of the switching element and a contact hole illustrated in FIG. 10, taken along line A-A.
Figure 12:
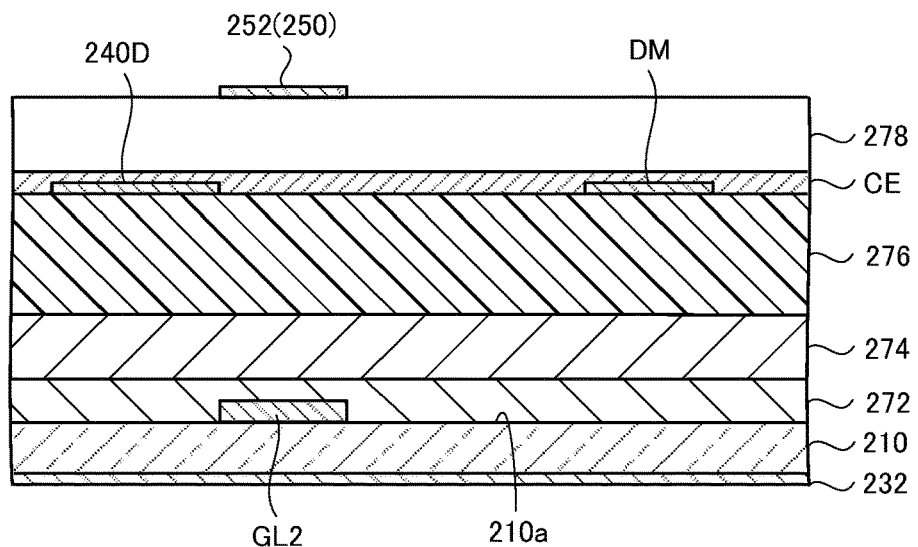
FIG. 12 is a cross-sectional view of the second scanning wiring and the dummy lines illustrated in FIG. 10, taken along line B-B.

Next, the second scanning wirings GL2, the second signal wirings DL2, the dummy lines DM, and the switching elements 240, the pixel electrodes 250, and the common electrodes CE of the second main pixels 202 are described while referencing FIGS. 10 to 12. FIG. 10 is a plan view illustrating one of the second scanning wirings GL2, one of the second signal wirings DL2, one of the switching elements 240, and the like. FIG. 11 is a cross-sectional view of the switching element 240 and a contact hole CH illustrated in FIG. 10, taken along line A-A. FIG. 12 is a cross-sectional view of the second scanning wiring GL2 and one of the dummy lines DM illustrated in FIG. 10, taken along line B-B. Note that, to facilitate comprehension, the common electrodes CE are omitted from FIG. 10, and the hatching of the third insulating layer 278 is omitted from FIGS. 11 and 12.

As illustrated in FIG. 11, the second scanning wiring GL2 is formed on the main surface 210a of the second TFT substrate 210. The second scanning wiring GL2 is covered by a first insulating layer 272. The second signal wiring DL2 is formed on the first insulating layer 272. The second signal wiring DL2 is covered by a second insulating layer 274. The second scanning wiring GL2 and the second signal wiring DL2 are formed from a metal such as aluminum (Al), molybdenum (Mo), or the like.

As illustrated in FIGS. 11 and 12, the common electrode CE is formed on an organic interlayer film 276 that is formed on the second insulating layer 274. In one example, the common electrode CE is formed from indium tin oxide (ITO). The common electrode CE is covered by a third insulating layer 278.

The switching element 240 is provided near the second scanning wiring GL2. As illustrated in FIGS. 10 and 11, each of the switching elements 240 includes a gate electrode 242, a semiconductor layer 244, a source electrode 246, and a drain electrode 248. In one example, the switching elements 240 are implemented as TFT elements.

The gate electrode 242 is formed integrally with the second scanning wiring GL2 on the main surface 210a of the second TFT substrate 210. As with the second scanning wiring GL2, the gate electrode 242 is covered by the first insulating layer 272. The semiconductor layer 244 is provided, via the first insulating layer 272, in an island manner on the gate electrode 242. In one example, the semiconductor layer 244 is formed from amorphous silicon. The source electrode 246 branches from the second signal wiring DL2 and is formed on the semiconductor layer 244. The drain electrode 248 extends along the second scanning wiring GL2 from on the semiconductor layer 244. The drain electrode 248 is connected to the pixel electrode 250 via the contact hole CH that penetrates the third insulating layer 278, the organic interlayer film 276, and the second insulating layer 274. As with the second signal wiring DL2, the source electrode 246 and the drain electrode 248 are formed from a metal such as aluminum (Al), molybdenum (Mo), or the like. Additionally, as illustrated in FIG. 11, the semiconductor layer 244, the source electrode 246, and the drain electrode 248 are covered by the second insulating layer 274.

As illustrated in FIG. 12, the dummy line DM is formed on the organic interlayer film 276, and is covered by the common electrode CE. The dummy line DM is formed from a metal such as, for example, aluminum (Al), molybdenum (Mo), or the like. The dummy line DM need not be electrically conductive, and may be formed from an organic material that has light blocking properties. Additionally, in the present embodiment, as illustrated in FIGS. 10 and 12, a dummy device 240D corresponding to a dummy of the switching element 240 is formed like the dummy line DM at a position facing the switching element 240.

As illustrated in FIGS. 11 and 12, the first insulating layer 272 covers the second scanning wiring GL2 and the gate electrode 242 of the switching element 240. The second insulating layer 274 covers the semiconductor layer 244, the source electrode 246, and the drain electrode 248 of the switching element 240, the second signal wiring DL2, and the first insulating layer 272. The organic interlayer film 276 is formed on the second insulating layer 274 from a photosensitive resin. The third insulating layer 278 covers the common electrode CE and the organic interlayer film 276. The first insulating layer 272, the second insulating layer 274, and the third insulating layer 278 are formed from silicon nitride (SiNx), silicon oxide (SiOx), or the like.

The pixel electrode 250 is connected to the switching element 240 via the contact hole CH. The pixel electrodes 250 have a comb-tooth shape, and teeth 252 are inclined with respect to the Y direction. In one example, the pixel electrodes 250 are formed from ITO.

Back Light

As illustrated in FIG. 1, the back light 300 is arranged on the back side surface (the −Z side) of the second liquid crystal display panel 200. In one example, the back light 300 is implemented as a direct back light. The back light 300 includes a white light emitting diode (LED), a reflective sheet, a diffusion sheet, and the like (all not illustrated in the drawings).

Display Controller

Figure 13:
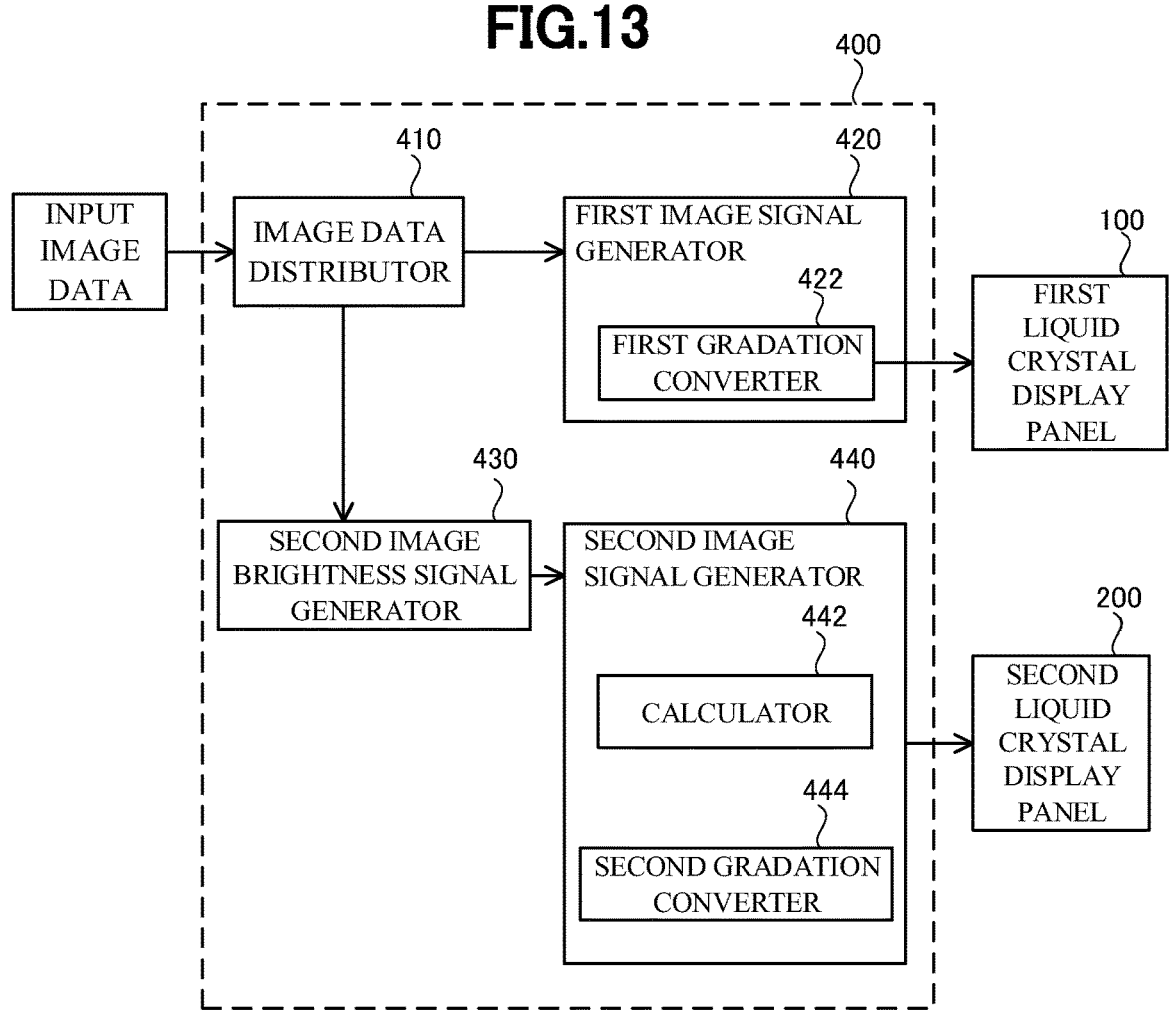
FIG. 13 is a block diagram illustrating a display controller according to Embodiment 1.

The display controller 400 controls the displays of the first liquid crystal display panel 100 and the second liquid crystal display panel 200. As illustrated in FIG. 13, the display controller 400 includes an image data distributor 410, a first image signal generator 420, a second image brightness signal generator 430, and a second image signal generator 440.

The image data distributor 410 distributes input image data to the first image signal generator 420 and the second image brightness signal generator 430.

The first image signal generator 420 generates, from the input image data distributed by the image data distributor 410, a color image to be displayed on the first liquid crystal display panel 100. Specifically, the first gradation converter 422 of the first image signal generator 420 performs gradation conversion for converting the distributed input image data to color image data having brightness-gradation characteristics suited to the first liquid crystal display panel 100. In one example, a lookup table in which input/output relationships are preset is used in the conversion of the data. The first image signal generator 420 sends a color image signal expressing the generated color image to the first driver circuit 136 of the first liquid crystal display panel 100.

The second image brightness signal generator 430 generates, from the input image data distributed from the image data distributor 410, a brightness signal for generating a monochrome image to be displayed on the second liquid crystal display panel 200. In one example, the second image brightness signal generator 430 calculates the brightness level of one second main pixel 202 of the second liquid crystal display panel 200 from an average value, a frequency value, a minimum value, a maximum value, and the like of a red gradation value, a green gradation value, and a blue gradation value of the 16 first main pixels 102 of the first liquid crystal display panel 100 into which the light emitted from one second main pixel 202 of the second liquid crystal display panel 200 enters. The calculated brightness level may be a gradation value. The second image brightness signal generator 430 sends a brightness signal expressing the calculated brightness level to the second image signal generator 440.

The second image signal generator 440 generates, on the basis of the brightness signal sent from the second image brightness signal generator 430, the monochrome image to be displayed on the second liquid crystal display panel 200. In one example, the second image signal generator 440 generates a monochrome image that has been subjected to averaging processing and gradation conversion. Specifically, in one example, the calculator 442 of the second image signal generator 440 uses a weighted average based on the distance from a target second main pixel 202 to average the brightness levels of the second main pixels 202 located within a predetermined distance from the target second main pixel 202. As a result, the second image signal generator 440 can generate a monochrome image that has blurred edges. Furthermore, the second gradation converter 444 of the second image signal generator 440 generates monochrome image data having brightness-gradation characteristics suited to the second liquid crystal display panel 200. The configuration of the second gradation converter 444 is the same as that of the first gradation converter 422 of the first image signal generator 420.

The monochrome image signal sent to the second liquid crystal display panel 200 is delayed, by the calculation of the brightness level, the averaging processing, and the like executed by the second image brightness signal generator 430, with respect to the color image signal sent to the first liquid crystal display panel 100. As such, the display controller 400 includes a non-illustrated synchronization circuit for synchronizing the outputting of the monochrome image signal and the color image signal. Due to this synchronization circuit, the monochrome image corresponding to the color image of the first liquid crystal display panel 100 is displayed on the second liquid crystal display panel 200 and, as such, an appropriate color image is displayed on the liquid crystal display device 10.

The display controller 400 is configured from a central processing unit (CPU), a memory, and the like. In one example, the CPU executes programs stored in the memory to realize the functions of the display controller 400.

As described above, the predetermined number N (in the present embodiment, N=13) of the bending points P of the second scanning wirings GL2 is greater than the number of colors (three) of the sub pixels 104 arranged in the X direction (the predetermined first direction) in one of the first main pixels 102 of the first liquid crystal display panel 100, and is not a natural number multiple of the number of colors (three) of the sub pixels 104 repeatedly arranged along the X direction of the first liquid crystal display panel 100. As such, the color, of the sub pixels 104 for which the entering light is blocked by the bending points P, successively changes. As a result, decreases in the brightness of the color of the sub pixels 104 caused by the blocking of the entering light (color bias resulting from color mixing) are averaged across the display region 101 of the first liquid crystal display panel 100, and color moire of the liquid crystal display device 10 can be suppressed. Additionally, color moire of the liquid crystal display device 10 can be suppressed even when the position of the observer changes.

Furthermore, the first light blocking pattern 260 that is formed from the second signal wirings DL2 and the dummy lines DM and that extends in the Y direction (the predetermined second direction) is disposed every four of the sub pixels 104, four being one greater than the number of colors (three) of the sub pixels 104 repeatedly arranged along the X direction. As such, the spatial frequency of the dark lines, formed from the wirings that have light blocking properties and that extend in the Y direction, can be increased and the dark lines that occur in the liquid crystal display device 10 can be made more difficult for the observer to recognize.

Embodiment 2

In Embodiment 1, the bending points P of the second scanning wirings GL2 are arranged along the X direction at a period of 13 (n=3, m=1) of the sub pixels 104 of the first liquid crystal display panel 100. However, a configuration is possible in which the predetermined number N is 14 (n=3, m=2). The other configurations of the present embodiment are the same as described in Embodiment 1.

Figure 14:
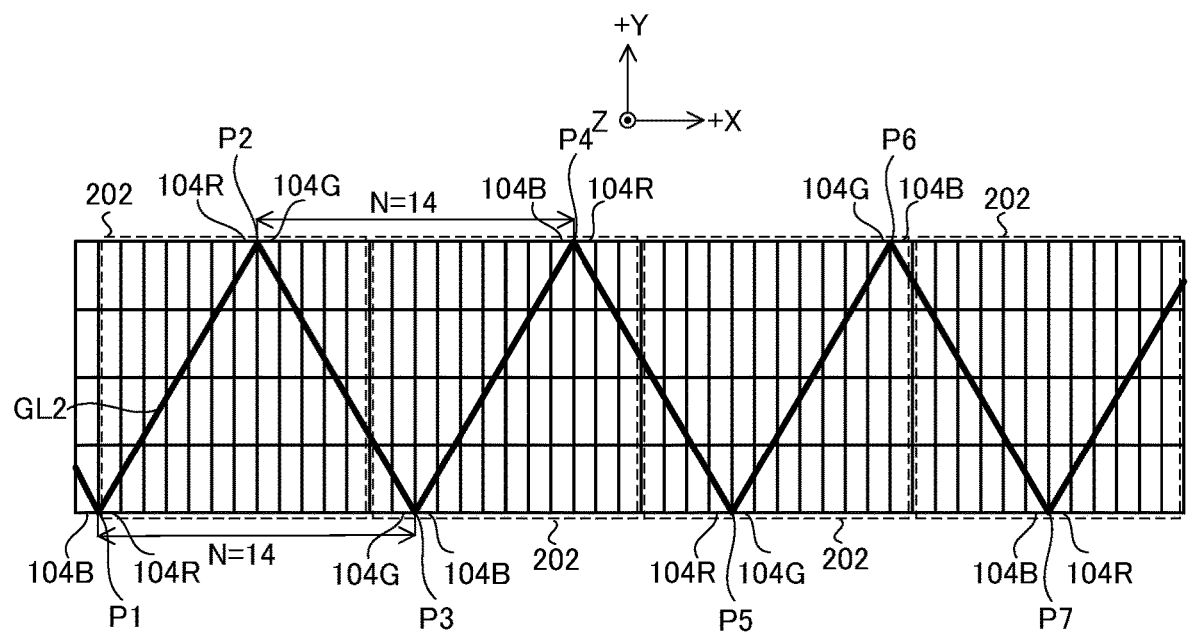
FIG. 14 is a schematic drawing illustrating a second scan wiring and sub pixels of a first liquid crystal display panel in four second main pixels, viewed from the front, according to Embodiment 2.

When the predetermined number N is 14, as illustrated in FIG. 14, for example, the second scanning wirings GL2 extend an amount corresponding to seven of the sub pixels 104 and bend. Additionally, the bending points P1, P3 and P5, P7 arranged along the X direction, and the bending points P2, P4, P6 arranged along the X direction each are arranged at a period corresponding to 14 of the sub pixels 104.

In the arrangement of the bending points P1 to P7, the period corresponds to 14 of the sub pixels 104 and, as such, when the bending point P1 is positioned between the blue pixel 104B and the red pixel 104R, the bending point P3 is positioned between the green pixel 104G and the blue pixel 104B, the bending point P5 is positioned between the red pixel 104R and the green pixel 104G, and the bending point P7 is positioned between the blue pixel 104B and the red pixel 104R. In the arrangement of the bending points P2, P4, P6, the bending point P2 is positioned between the red pixel 104R and the green pixel 104G, the bending point P4 is positioned between the blue pixel 104B and the red pixel 104R, and the bending point P6 is positioned between the green pixel 104G and the blue pixel 104B.

That is, in the present embodiment as well, as in Embodiment 1, the color, of the sub pixels 104 sandwiching the bending points P arranged in the X direction, successively changes. Accordingly, in the present embodiment as well, decreases in the brightness of the color of the sub pixels 104 (color bias resulting from color mixing) are averaged across the display region 101 of the first liquid crystal display panel 100, and color moire of the liquid crystal display device 10 can be suppressed.

Thus, color moire of the liquid crystal display device 10 can be suppressed even when the predetermined number N is 14 (n=3, m=2).

Embodiment 3

Figure 15:
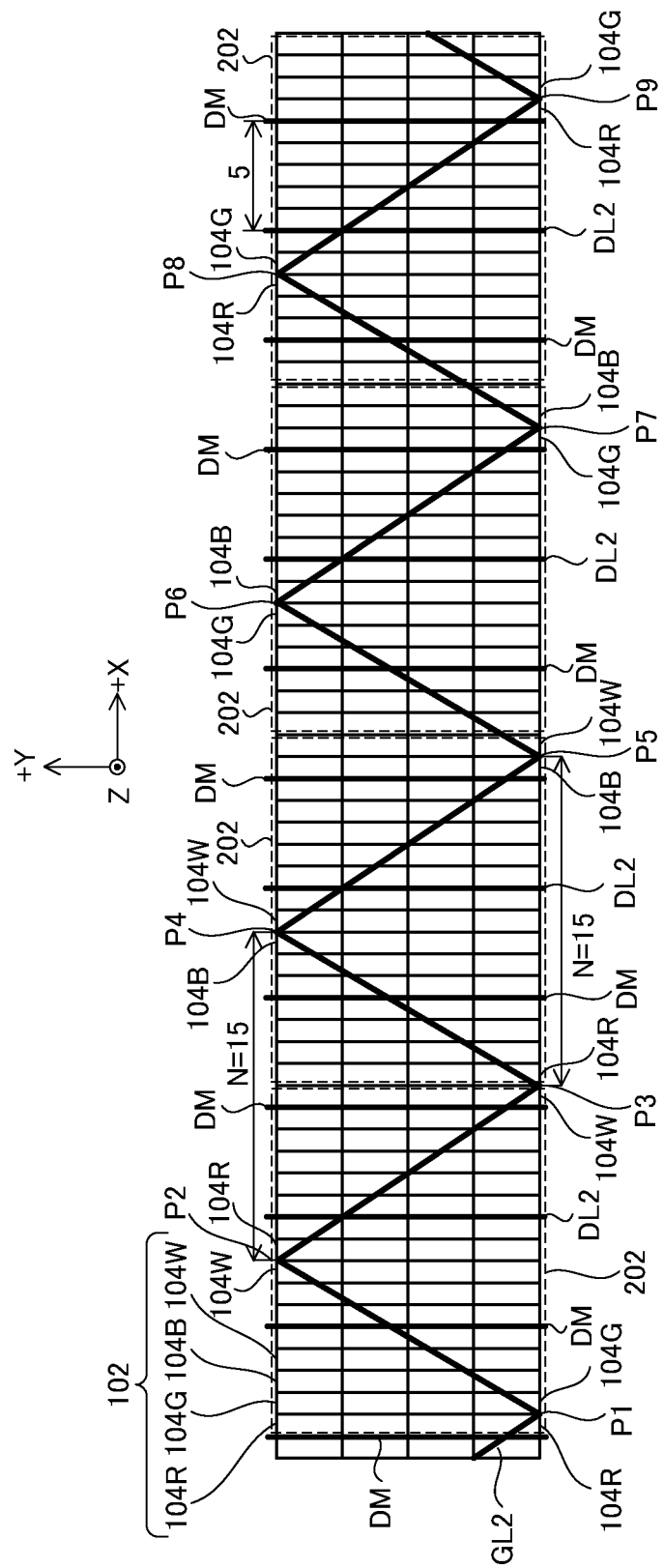
FIG. 15 is a schematic drawing illustrating a second scan wiring and sub pixels of a first liquid crystal display panel in four second main pixels, viewed from the front, according to Embodiment 3.

In Embodiment 1, the first main pixels 102 of the first liquid crystal display panel 100 are formed from the red pixel 104R, the green pixel 104G, and the blue pixel 104B that are arranged in the X direction. However, as illustrated in FIG. 15, a configuration is possible in which the first main pixels 102 of the first liquid crystal display panel 100 are formed from the red pixel 104R, the green pixel 104G, the blue pixel 104B, and a white pixel 104W that are arranged in the X direction. The white pixel 104W emits white light.

In the present embodiment, the first main pixels 102 are arranged in the X direction and the Y direction, and the red pixel 104R, the green pixel 104G, and the blue pixel 104B, and the white pixel 104W of the first main pixels 102 are arranged in the X direction. As such, in one of the first main pixels 102, the number of colors of the sub pixels 104 arranged in the X direction is four. The number of colors of the sub pixels 104 repeatedly arranged along the X direction is also four. The other configurations of the first liquid crystal display panel 100 of the present embodiment are the same as in Embodiment 1.

As illustrated in FIG. 15, in the second liquid crystal display panel 200 of the present embodiment, two of the dummy lines DM are disposed between two of the second signal wirings DL2. When viewing the liquid crystal display device 10 from the front, as illustrated in FIG. 15, the second signal wirings DL2 and the dummy lines DM (that is, the first light blocking pattern 260) are disposed every five of the sub pixels 104, five being one greater than the number of colors (four) of the sub pixels 104 repeatedly arranged along the X direction.

In the second liquid crystal display panel 200 of the present embodiment as well, the bending points P of the second scanning wirings GL2 are arranged along the X direction at a period corresponding to a predetermined number N of the sub pixels 104 of the first liquid crystal display panel 100. The predetermined number N of the present embodiment is greater that the number of colors (four) of the sub pixels 104 arranged in the X direction in one of the first main pixels 102 of the first liquid crystal display panel 100, and is not a natural number multiple of the number of colors (four) of the sub pixels 104 repeatedly arranged along the X direction of the first liquid crystal display panel 100. Additionally, when the natural number is n and a real number is m, the predetermined number N is expressed by equations (3) and (4) below. In the present embodiment, as illustrated in FIG. 15, a case is described in which the predetermined number N is 15 (n=3, m=3). The other configurations of the second liquid crystal display panel 200, and the configurations of the back light 300 and the display controller 400 of the present embodiment are the same as in Embodiment 1.

$$N=4\times n+m \quad (3)$$

$$0<m<4 \quad (4)$$

For example, as illustrated in FIG. 15, when the predetermined number N is 15, the second scanning wirings GL2 extend an amount corresponding to seven or eight of the sub pixels 104 (for example, seven between the bending point P1 and the bending point P2, and eight between the bending point P2 and the bending point P3) and bend. The bending points P1, P3, P5, P7, P9 arranged along the X direction, and the bending points P2, P4, P6, P8 arranged along the X direction each are arranged at a period corresponding to 15 of the sub pixels 104.

In the arrangement of the bending points P1 to P9, the period corresponds to 15 of the sub pixels 104 and, as such, when the bending point P1 is positioned between the red pixel 104R and the green pixel 104G, the bending point P3 is positioned between the white pixel 104W and the red pixel 104R, and the bending point P5 is positioned between the blue pixel 104B and the white pixel 104W. Furthermore, the bending point P7 is positioned between the green pixel 104G and the blue pixel 104B, and the bending point P9 is positioned between the red pixel 104R and the green pixel 104G.

In the arrangement of the bending points P2 to P8, the bending point P2 is positioned between the white pixel 104W and the red pixel 104R, and the bending point P4 is positioned between the blue pixel 104B and the white pixel 104W. Furthermore, the bending point P6 is positioned between the green pixel 104G and the blue pixel 104B, and the bending point P8 is positioned between the red pixel 104R and the green pixel 104G.

Thus, in the present embodiment as well, as in Embodiment 1, the color, of the sub pixels 104 sandwiching the bending points P arranged in the X direction, successively changes. Accordingly, in the present embodiment as well, decreases in the brightness of the color of the sub pixels 104 (color bias resulting from color mixing) are averaged across the display region 101 of the first liquid crystal display panel 100, and color moire of the liquid crystal display device 10 can be suppressed.

Additionally, in the present embodiment, the second signal wirings DL2 and the dummy lines DM (the first light blocking pattern 260) are disposed every five of the sub pixels 104 of the first liquid crystal display panel 100 and, as such, the spatial frequency of the dark lines, formed from the wirings that have light blocking properties and that extend in the Y direction, can be increased, and the dark lines can be made more difficult for the observer to recognize.

Embodiment 4

In Embodiment 3, the red pixel 104R, the green pixel 104G, the blue pixel 104B, and the white pixel 104W that form one of the first main pixels 102 of the first liquid crystal display panel 100 are arranged in one row in the X direction. However, a configuration is possible in which the red pixel 104R, the green pixel 104G, the blue pixel 104B, and the white pixel 104W that form one of the first main pixels 102 of the first liquid crystal display panel 100 are arranged in two rows in the X direction.

In the present embodiment, the configuration of the first main pixels 102 of the first liquid crystal display panel 100, and the bending of the second scanning wirings GL2 of the second liquid crystal display panel 200 differ from the configuration of the first main pixels 102 and the bending of the second scanning wirings GL2 of Embodiment 3. The other configurations of the liquid crystal display device 10 are the same as in Embodiments 1 and 3.

Figure 16:
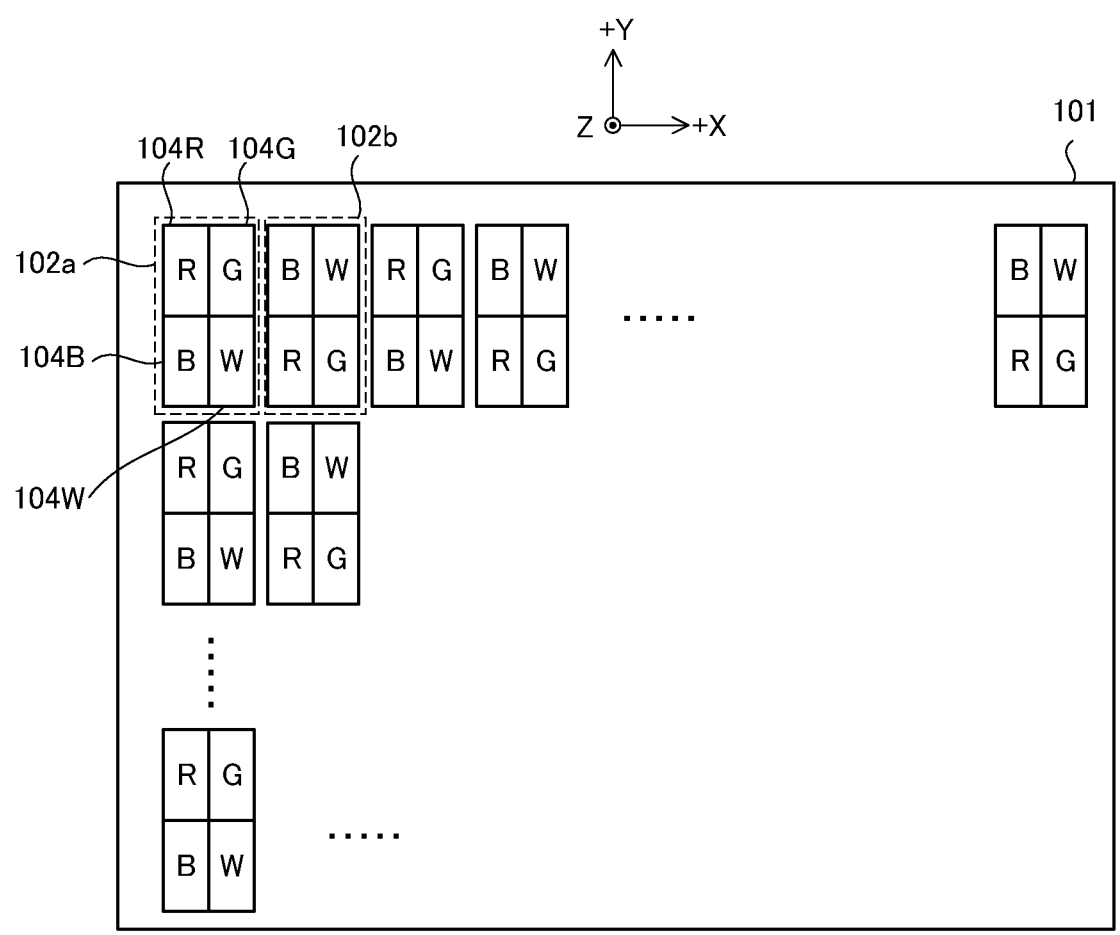
FIG. 16 is a plan view illustrating a first main pixel of a first liquid crystal display panel according to Embodiment 4.

As illustrated in FIG. 16, the first liquid crystal display panel 100 of the present embodiment includes first main pixels 102$a$ and first main pixels 102$b$ as the first main pixels 102. The first main pixels 102$a$ and the first main pixels 102$b$ are arranged alternately in the X direction. The first main pixels 102$a$ or the first main pixels 102$b$ are arranged in one row in the Y direction.

In the first main pixels 102$a$, the red pixel 104R and the green pixel 104G are arranged in order in a first row in the X direction, and the blue pixel 104B and the white pixel 104W are arranged in order in a second row in the X direction. In the first main pixels 102$b$, the blue pixel 104B and the white pixel 104W are arranged in order in a first row in the X direction, and the red pixel 104R and the green pixel 104G are arranged in order in a second row in the X direction.

In the present embodiment, the first main pixels 102$a$ and the first main pixels 102$b$ are arranged alternately in the X direction, the red pixel 104R and the green pixel 104G are arranged in the first row of the first main pixels 102$a$, and the blue pixel 104B and the white pixel 104W are arranged in the first row of the first main pixels 102$b$. Additionally, the blue pixel 104B and the white pixel 104W are arranged in the second row of the first main pixels 102$a$, and the red pixel 104R and the green pixel 104G are arranged in the second row of the first main pixels 102$b$. Accordingly, in the present embodiment, the number of colors of the sub pixels 104 arranged in the X direction in one of the first main pixels 102$a$, 102$b$ is two (the red pixel 104R and the green pixel 104G, or the blue pixel 104B and the white pixel 104W), and the number of colors of the sub pixels 104 repeatedly arranged in the X direction is four (the red pixel 104R, the green pixel 104G, the blue pixel 104B, and the white pixel 104W).

In the present embodiment, in the second liquid crystal display panel 200, one of the second main pixels 202 of the second liquid crystal display panel 200 corresponds to 16 (eight in the X direction and two in the Y direction) of the first main pixels 102 of the first liquid crystal display panel 100, and one of the second main pixels 202 of the second liquid crystal display panel 200 emits light on 16 of the first main pixels 102 of the first liquid crystal display panel 100.

In the second liquid crystal display panel 200 of the present embodiment as well, the bending points P of the second scanning wirings GL2 are arranged along the X direction at a period corresponding to a predetermined number N of the sub pixels 104 of the first liquid crystal display panel 100. The predetermined number N of the present embodiment is greater that the number of colors (two) of the sub pixels 104 arranged in the X direction in one of the first main pixels 102 of the first liquid crystal display panel 100, and is not a natural number multiple of the number of colors (four) of the sub pixels 104 repeatedly arranged along the X direction of the first liquid crystal display panel 100. In this case, when the natural number is n and a real number is m, the predetermined number N satisfies equations (5) and (6) below. In the present embodiment, as illustrated in FIG. 17, a case is described in which the predetermined number N is 13 (n=6, m=1).

$$N=2\times n+m \qquad (5)$$

$$0<m<2 \qquad (6)$$

Figure 17:
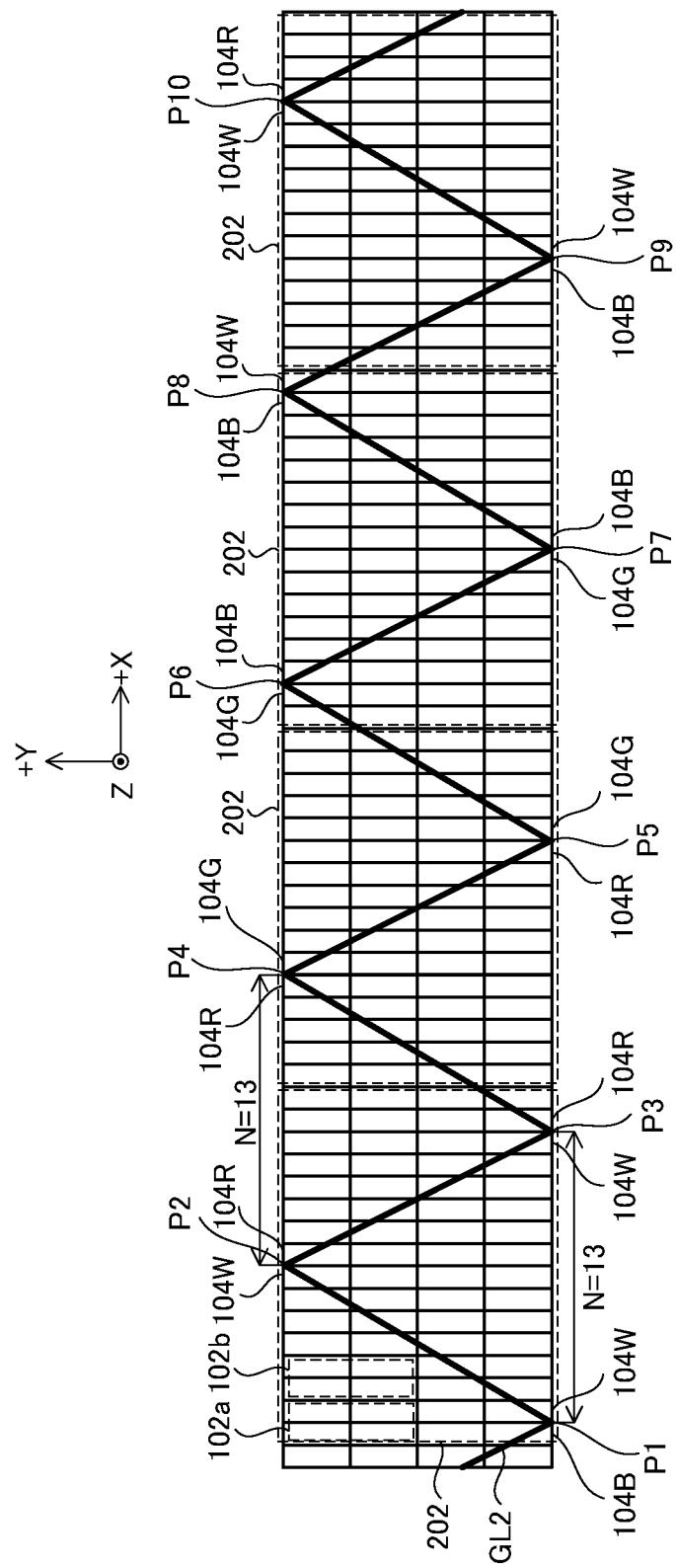
FIG. 17 is a schematic drawing illustrating a second scan wiring and sub pixels of the first liquid crystal display panel in four second main pixels, viewed from the front, according to Embodiment 4.

For example, as illustrated in FIG. 17, when the predetermined number N is 13, the second scanning wirings GL2 extend an amount corresponding to six or seven of the sub pixels 104 (for example, seven between the bending point P1 and the bending point P2, and six between the bending point P2 and the bending point P3) and bend. The bending points P1, P3, P5, P7, P9 arranged along the X direction, and the bending points P2, P4, P6, P8, P10 arranged along the X direction each are arranged at a period corresponding to 13 of the sub pixels 104.

In the arrangement of the bending points P1 to P9, when the bending point P1 is positioned between the blue pixel 104B and the white pixel 104W, the bending point P3 is positioned between the white pixel 104W and the red pixel 104R, and the bending point P5 is positioned between the red pixel 104R and the green pixel 104G. Furthermore, the bending point P7 is positioned between the green pixel 104G and the blue pixel 104B, and the bending point P9 is positioned between the blue pixel 104B and the white pixel 104W.

In the arrangement of the bending points P2 to P10, the bending point P2 is positioned between the white pixel 104W and the red pixel 104R, the bending point P4 is positioned between the red pixel 104R and the green pixel 104G, and the bending point P6 is positioned between the green pixel 104G and the blue pixel 104B. Furthermore, the bending point P8 is positioned between the blue pixel 104B and the white pixel 104W, and the bending point P10 is positioned between the white pixel 104W and the red pixel 104R.

Thus, in the present embodiment as well, as in Embodiment 1, the color, of the sub pixels 104 sandwiching the bending points P arranged in the X direction, successively changes. Accordingly, in the present embodiment as well, decreases in the brightness of the color of the sub pixels 104 (color bias resulting from color mixing) are averaged across the display region 101 of the first liquid crystal display panel 100, and color moire of the liquid crystal display device 10 can be suppressed. Note that, in the present embodiment as well, as in Embodiment 3, the second signal wirings DL2 and the dummy lines DM (the first light blocking pattern 260) are disposed every five of the sub pixels 104 of the first liquid crystal display panel 100.

Embodiment 5

A configuration is possible in which when, as in Embodiment 4, the predetermined number N is greater that the number of colors (two) of the sub pixels 104 arranged in the X direction in one of the first main pixels 102 of the first liquid crystal display panel 100, and is not a natural number multiple of the number of colors (four) of the sub pixels 104 repeatedly arranged along the X direction of the first liquid crystal display panel 100, the predetermined number N satisfies equation (7) below and equation (6) described above. In the present embodiment, as illustrated in FIG. 18, a case is described in which the predetermined number N is 14 (n=3, m=1, n is a natural number, m is a real number).

$$N=2\times(2\times n+m) \quad (7)$$

Figure 18:
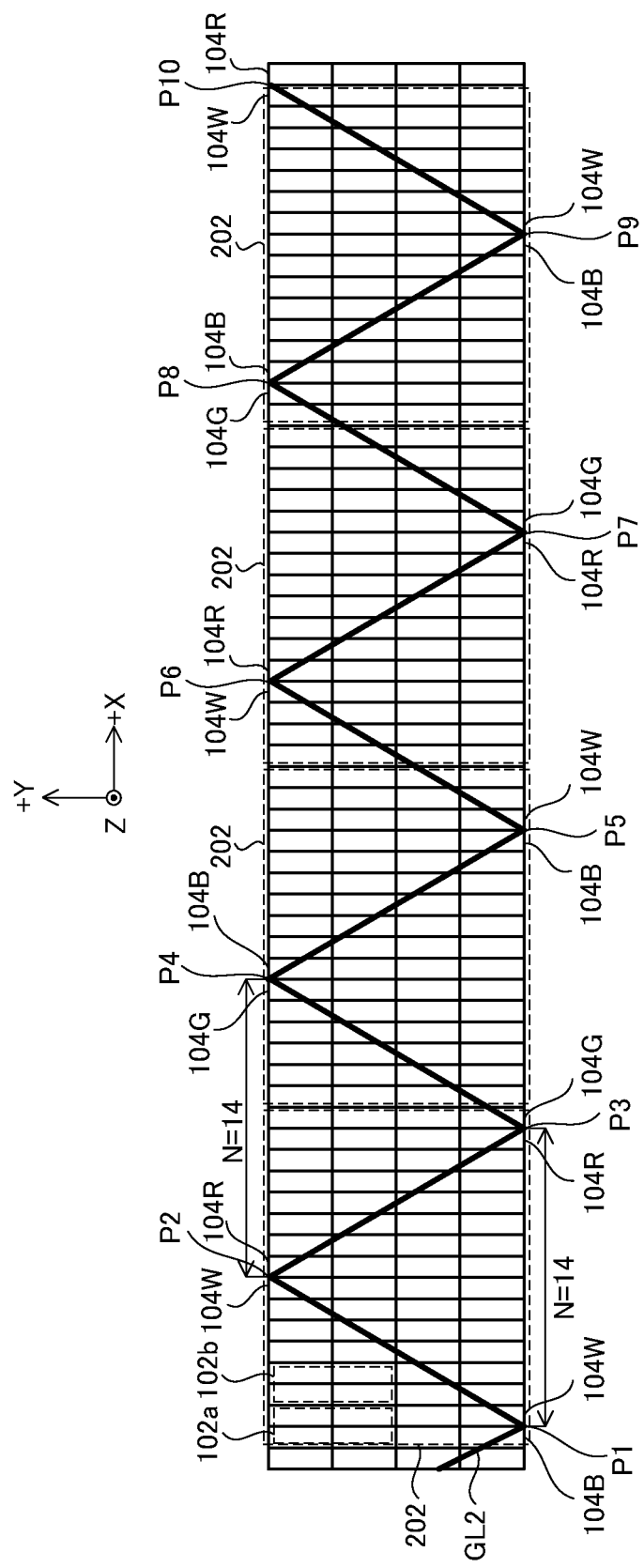
FIG. 18 is a schematic drawing illustrating a second scan wiring and sub pixels of a first liquid crystal display panel in four second main pixels, viewed from the front, according to Embodiment 5.

When the predetermined number N is 14, for example, as illustrated in FIG. 18, the second scanning wirings GL2 extend an amount corresponding to seven of the sub pixels 104 and bend. The bending points P1, P3, P5, P7, P9 arranged along the X direction, and the bending points P2, P4, P6, P8, P10 arranged along the X direction each are arranged at a period corresponding to 14 of the sub pixels 104.

In the arrangement of the bending points P1 to P9, when the bending point P1 is positioned between the blue pixel 104B and the white pixel 104W, the bending point P3 positioned between the red pixel 104R and the green pixel 104G, and the bending point P5 is positioned between the blue pixel 104B and the white pixel 104W. Furthermore, the bending point P7 is positioned between the red pixel 104R and the green pixel 104G, and the bending point P9 is positioned between the blue pixel 104B and the white pixel 104W.

In the arrangement of the bending points P2 to P10, the bending point P2 is positioned between the white pixel 104W and the red pixel 104R, the bending point P4 is positioned between the green pixel 104G and the blue pixel 104B, and the bending point P6 is positioned between the white pixel 104W and the red pixel 104R. Furthermore, the bending point P8 is positioned between the green pixel 104G and the blue pixel 104B, and the bending point P10 is positioned between the white pixel 104W and the red pixel 104R.

Thus, as in Embodiments 1 to 4, in the present embodiment as well, the color, of the sub pixels 104 sandwiching the bending points P arranged in the X direction, successively changes. Accordingly, in the present embodiment as well, decreases in the brightness of the color of the sub pixels 104 (color bias resulting from color mixing) are averaged across the display region 101 of the first liquid crystal display panel 100, and color moire of the liquid crystal display device 10 can be suppressed. Note that, in the present embodiment as well, as in Embodiments 3 and 4, the second signal wirings DL2 and the dummy lines DM (the first light blocking pattern 260) are disposed every five of the sub pixels 104 of the first liquid crystal display panel 100, Embodiment 6

In Embodiments 1 to 5, the second signal wirings DL2 and the dummy lines DM (the first light blocking pattern 260) of the second liquid crystal display panel 200 are positioned between the sub pixels 104 of the first liquid crystal display panel 100, and extend in the Y direction while bending along the outer shape of the sub pixels 104 of the first liquid crystal display panel 100. However, a configuration is possible in which the second signal wirings DL2 and the dummy lines DM of the second liquid crystal display panel 200 are inclined with respect to the Y direction across the sub pixels 104 of the first liquid crystal display panel 100.

The configuration of the first liquid crystal display panel 100 of the present embodiment is the same as the configuration of the first liquid crystal display panel 100 of Embodiment 1. Additionally, with the exception of the second signal wirings DL2 and the dummy lines DM, the configuration of the second liquid crystal display panel 200 of the present embodiment is the same as the configuration of the second liquid crystal display panel 200 of Embodiment 1. As such, the second signal wirings DL2 and the dummy lines DM of the second liquid crystal display panel 200 are described while referencing FIG. 19.

As with the second signal wirings DL2 and the dummy lines DM of Embodiment 1, in the present embodiment, two of the dummy lines DM are disposed between two of the second signal wirings DL2. Additionally, the second signal wirings DL2 and the dummy lines DM of the present embodiment are disposed at a period corresponding to four of the sub pixels 104 of the first liquid crystal display panel 100, and form a second light blocking pattern 280 that blocks the light entering from the back light 300.

Figure 19:
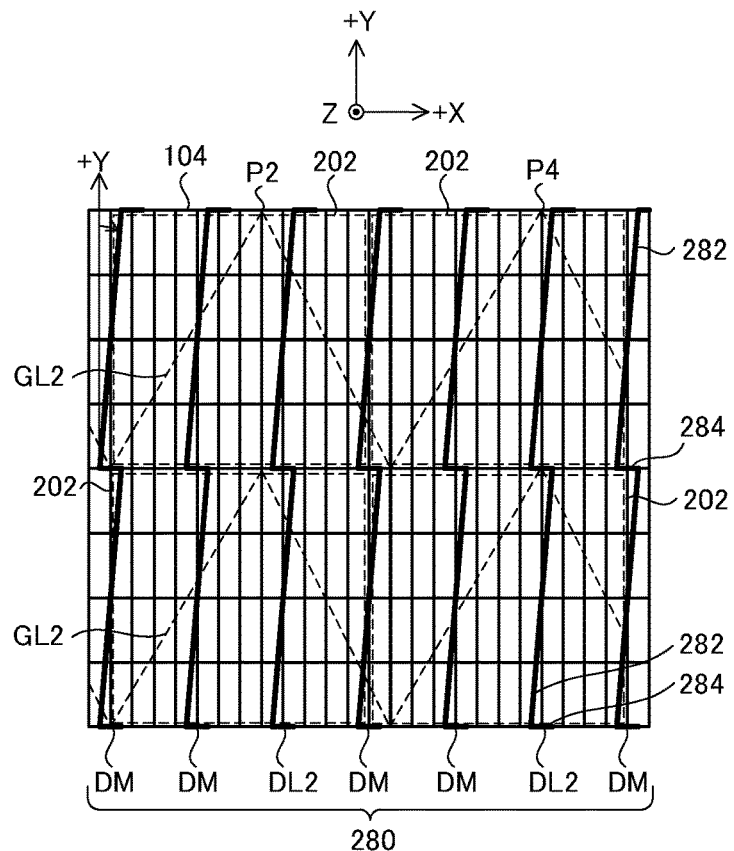
FIG. 19 is a schematic drawing illustrating second signal wirings and dummy lines according to Embodiment 6.

In the present embodiment, as illustrated in FIG. 19, for every one of the second main pixels 202 of the second liquid crystal display panel 200, the second signal wirings DL2 and the dummy lines DM (the second light blocking pattern 280) are inclined, at an acute angle with respect to the +Y direction, across two rows of the sub pixels 104 extending in the Y direction of the first liquid crystal display panel 100. An incline 282 inclined at the acute angle with respect to the +Y direction is inclined an amount corresponding to one sub pixel 104 across the two rows of the sub pixels 104 extending in the Y direction and through four of the sub pixels 104. Two of the inclines 282 are connected by a flat section 284 parallel to the X direction.

In the present embodiment, the second light blocking pattern 280 (the second signal wirings DL2 and the dummy lines DM) is inclined with respect to the Y direction across two rows of the sub pixels 104 extending in the Y direction. As such, even if the position of the observer changes, the color, of the sub pixels 104 of the first liquid crystal display panel 100 for which the entering light is blocked by the second light blocking pattern 280, does not hardly change. Accordingly, the color moire of the liquid crystal display device 10 that occurs due to changes in the position of the observer can be suppressed.

Embodiment 7

In Embodiments 1 to 6, the second main pixels 202 of the second liquid crystal display panel 200 have a rectangular shape. However, the shape of the second main pixels 202 of the second liquid crystal display panel 200 is not limited to a rectangular shape.

The configurations of the first liquid crystal display panel 100, the back light 300, and the display controller 400 of the present embodiment are the same as in Embodiment 1. As such, the second liquid crystal display panel 200 of the present embodiment is described.

Figure 20:
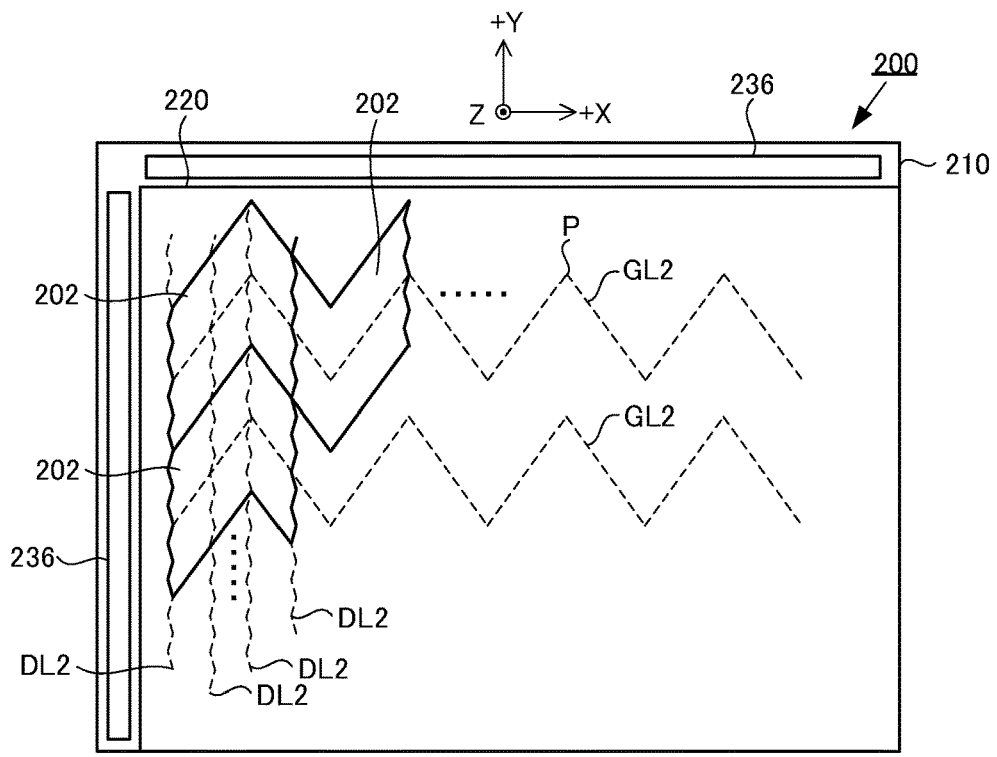
FIG. 20 is a plan view illustrating a second liquid crystal display panel according to Embodiment 7.
Figure 21:
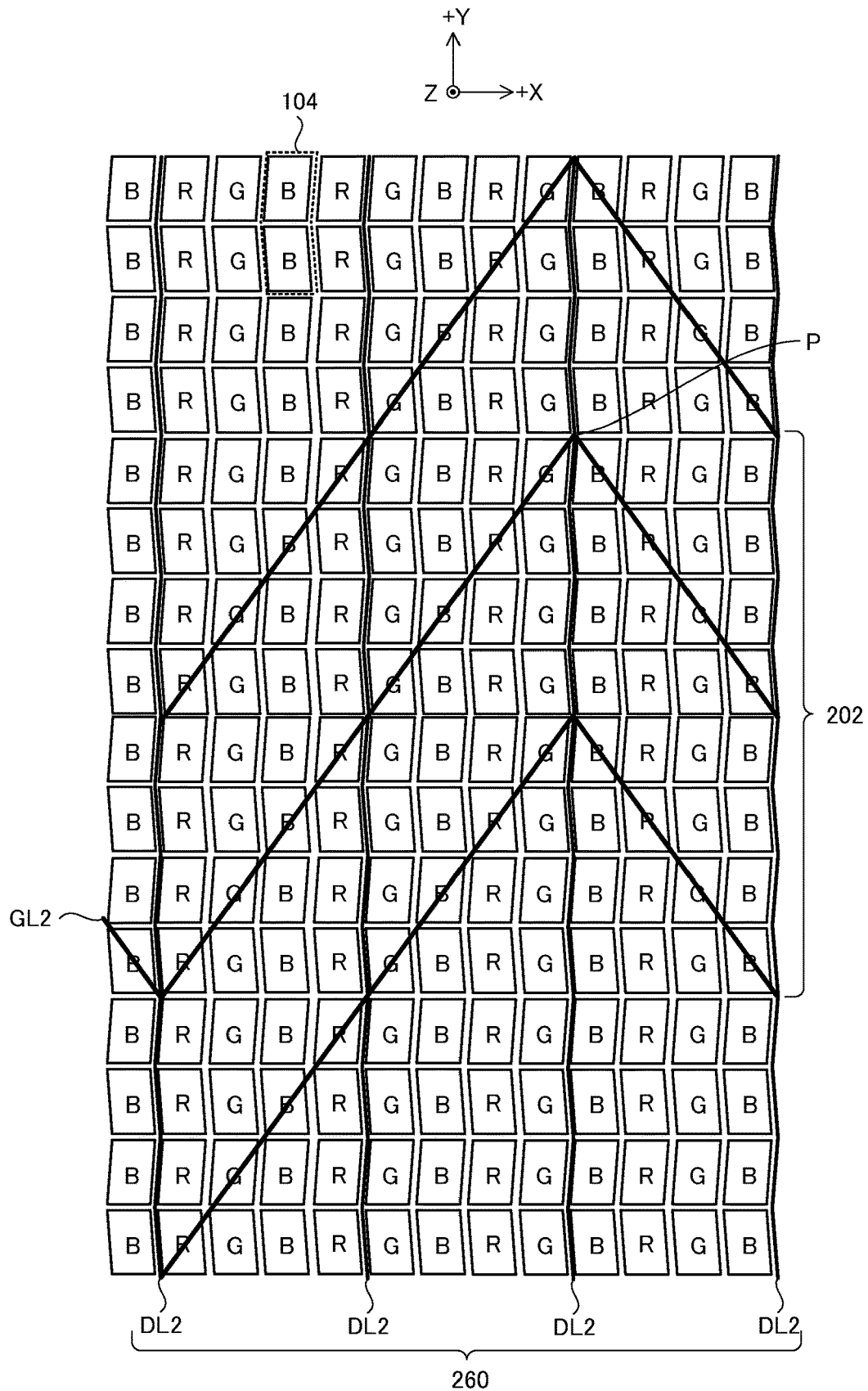
FIG. 21 is a schematic drawing illustrating second scanning wirings, second signal wirings, and sub pixels of a first liquid crystal display panel in one second main pixel according to Embodiment 7.

As illustrated in FIG. 20, in the second liquid crystal display panel 200 of the present embodiment, second main pixels 202, that have an asymmetrical V shape that bends along the second scanning wirings GL2, are arranged in a matrix in the X direction and the Y direction. As illustrated in FIG. 21, one of the second main pixels 202 of the second liquid crystal display panel 200 corresponds to a plurality of the sub pixels 104 of the first liquid crystal display panel 100, and one of the second main pixels 202 of the second liquid crystal display panel 200 emits light on the plurality of sub pixels 104 of the first liquid crystal display panel 100.

The second main pixels 202 have an asymmetrical V shape. As illustrated in FIG. 21, sides on the +Y side and −Y side of the outer shape (the asymmetrical V shape) of the second main pixels 202 are parallel to the second scanning wirings GL2. Additionally, as illustrated in FIG. 20, sides on the +Y side and −Y side of the outer shape of the second main pixels 202 are positioned between adjacent second scanning wirings GL2. As illustrated in FIG. 21, the sides on the +X side and −X side of the outer shape of the second main pixels 202 bend along the outer shape of the sub pixels 104 of the first liquid crystal display panel 100. Furthermore, sides on the +X side and −X side of the outer shape of the second main pixels 202 overlap the first signal wirings DL1 of the first liquid crystal display panel 100.

As with the second scanning wirings GL2 of Embodiment 1, the second scanning wirings GL2 of the present embodiment pass through the inside of the second main pixels 202 and extend in a zig-zag in the X direction. Additionally, the bending points P of the second scanning wirings GL2 are positioned in the second main pixels 202, between the sub pixels 104 of the first liquid crystal display panel 100.

Figure 22:
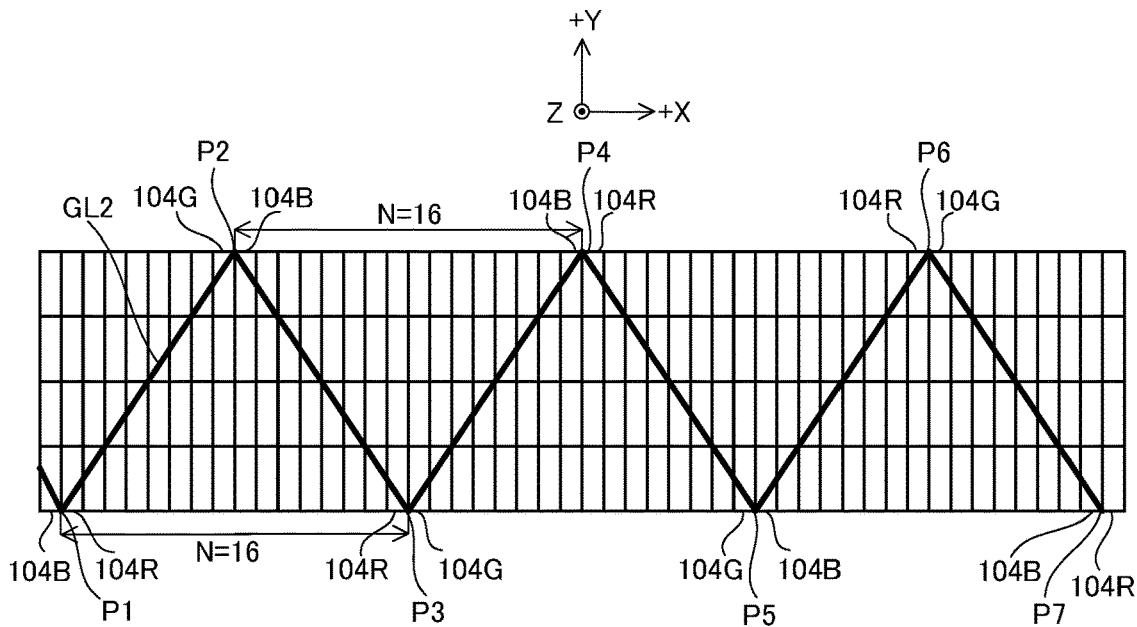
FIG. 22 is a schematic drawing illustrating one of the second scanning wirings and the sub pixels of the first liquid crystal display panel according to Embodiment 7.

As with the second scanning wirings GL2 of Embodiment 1, the second scanning wirings GL2 of the present embodiment are arranged along the X direction at a period corresponding to a predetermined number N of the sub pixels 104 of the first liquid crystal display panel 100. The predetermined number N is greater that the number of colors (three) of the sub pixels 104 arranged in the X direction in one of the first main pixels 102 of the first liquid crystal display panel 100, and is not a natural number multiple of the number of colors (three) of the sub pixels 104 repeatedly arranged along the X direction of the first liquid crystal display panel 100. Additionally, the predetermined number N satisfies equations (1) and (2) described above. For example, when the predetermined number N is 16 (n=5, m=1), as illustrated in FIG. 22, the color, of the sub pixels 104 for which the entering light is blocked by the bending points P, successively changes. Accordingly, in the present embodiment as well, decreases in the brightness of the color of the sub pixels 104 (color bias resulting from color mixing) are averaged across the display region 101 of the first liquid crystal display panel 100, and color moire of the liquid crystal display device 10 can be suppressed. Note that, in FIG. 22, one sub pixel 104 of the first liquid crystal display panel 100 is illustrated as one rectangle.

When viewing the liquid crystal display device 10 from the front, as illustrated in FIG. 21, the second signal wirings DL2 of the present embodiment are positioned between the sub pixels 104 of the first liquid crystal display panel 100, and extend in the Y direction while bending along the outer shape of the sub pixels 104 of the first liquid crystal display panel 100. In the present embodiment, the second liquid crystal display panel 200 does not include the dummy lines DM, and the second signal wirings DL2 are disposed every four of the sub pixels 104 of the first liquid crystal display panel 100 to form the first light blocking pattern 260. In the present embodiment as well, the second signal wirings DL2 (the first light blocking pattern 260) are disposed every four of the sub pixels 104 of the first liquid crystal display panel 100 and, as such, as in Embodiment 1, the spatial frequency of the dark lines, formed from the wirings that have light blocking properties and that extend in the Y direction, can be increased, and the dark lines can be made more difficult for the observer to recognize.

Figure 23:
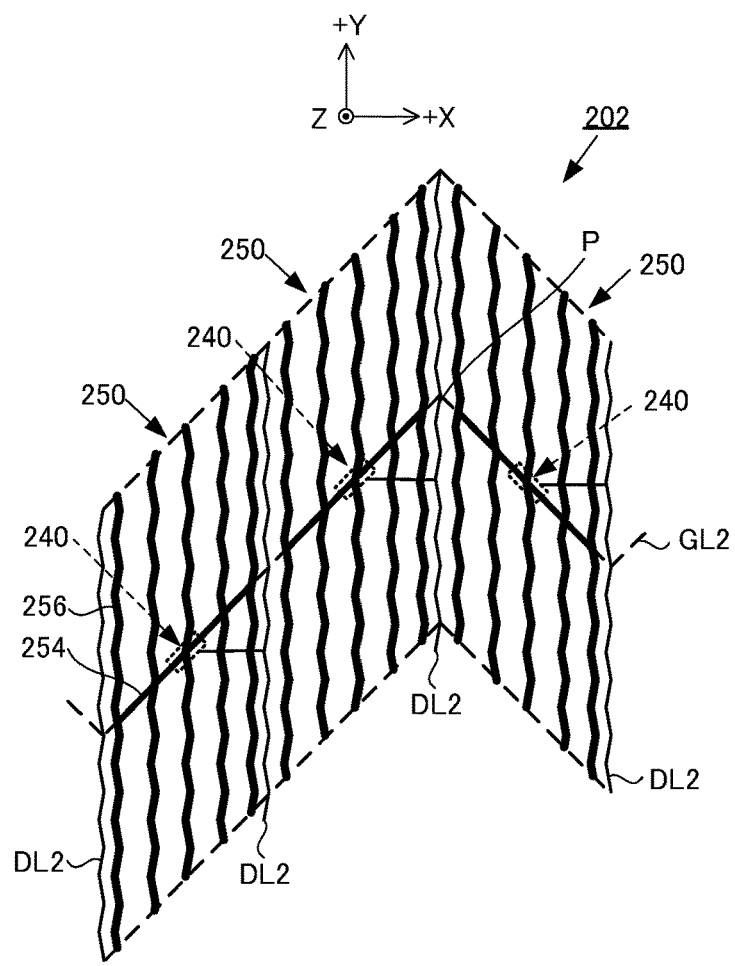
FIG. 23 is a schematic drawing illustrating pixel electrodes according to Embodiment 7.

In the present embodiment, as illustrated in FIG. 23, one of the second main pixels 202 includes three of the switching elements 240 and three of the pixel electrodes 250. One of the second main pixels 202 is driven by voltage from one of the second scanning wirings GL2 and three of the second signal wirings DL2. Note that, in FIG. 23, to facilitate comprehension, the switching elements 240 are illustrated by dashed lines and the pixel electrodes 250 are illustrated by solid lines.

The pixel electrodes 250 include base line electrodes 254 and linear electrodes 256. The base line electrodes 254 are provided on the second scanning wirings GL2, and extend along the second scanning wirings GL2. The base line electrodes 254 are connected to the switching elements 240 via non-illustrated contact holes.

The linear electrodes 256 branch from the base line electrodes 254 and extend in the +Y direction or the −Y direction. As with the second signal wirings DL2, the linear electrodes 256 bend along the outer shape of the sub pixels 104 of the first liquid crystal display panel 100.

The other configurations of the second liquid crystal display panel 200 of the present embodiment are the same as in Embodiment 1.

Thus, the shape of the second main pixels 202 of the second liquid crystal display panel 200 is not limited to a rectangle. As in Embodiment 1, in the present embodiment as well, color moire of the liquid crystal display device 10 can be suppressed.

Modified Examples

Embodiments have been described, but various modifications can be made to the present disclosure without departing from the spirit and scope of the present disclosure.

For example, in the embodiments, the first liquid crystal display panel 100 and the second liquid crystal display panel 200 are implemented as horizontal electric field type liquid crystal display panels. However, a configuration is possible in which the type of the first liquid crystal display panel 100 and the second liquid crystal display panel 200 is a vertical alignment (VA) mode, a twisted nematic (TN) mode, or the like. Additionally, the display region 101 of the first liquid crystal display panel 100 is not limited to having a rectangular shape, and may have a non-rectangular shape.

In the embodiments, the first polarizing plate 132 of the first liquid crystal display panel 100 also serves as the polarizing plate on the light emission side of the second liquid crystal display panel 200. However, a configuration is possible in which the second liquid crystal display panel 200 includes a polarization plate on the main surface 220b of the second counter substrate 220.

In Embodiments 1 to 6, one of the second main pixels 202 of the second liquid crystal display panel 200 corresponds to 16 of the first main pixels 102 of the first liquid crystal display panel 100. However, the number of first main pixels 102 of the first liquid crystal display panel 100 that one of the second main pixels 202 of the second liquid crystal display panel 200 corresponds to may be set as desired.

In the embodiments, the bending points P of the second scanning wirings GL2 are positioned between the sub pixels 104 of the first liquid crystal display panel 100, but the bending points P of the second scanning wirings GL2 need not be positioned between the sub pixels 104.

Figure 24:
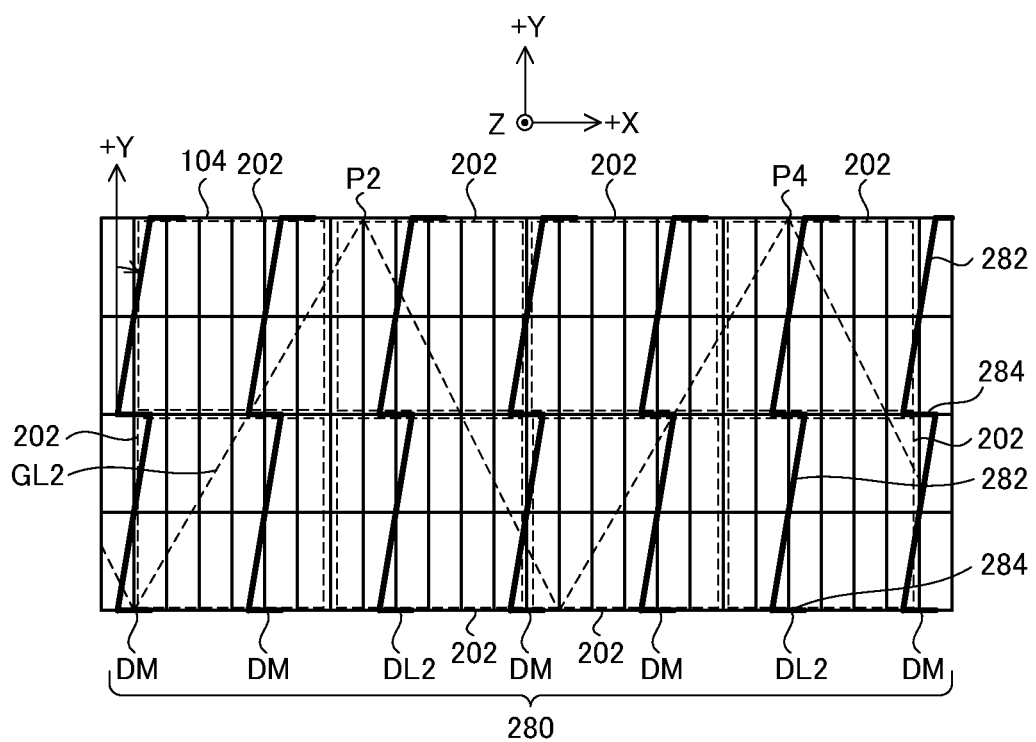
FIG. 24 is a schematic drawing illustrating second signal wirings and dummy lines according to a modified example.

In Embodiment 6, one of the second main pixels 202 of the second liquid crystal display panel 200 corresponds to 16 (four in the X direction and four in the Y direction) of the first main pixels 102 of the first liquid crystal display panel 100, and the incline 282 of the second light blocking pattern 280 (the second signal wirings DL2 and the dummy lines DM) is inclined an amount corresponding to one sub pixel 104 across the two rows of the sub pixels 104 extending in the Y direction and through four of the sub pixels 104. However, it is sufficient that the second light blocking pattern 280 is inclined with respect to the Y direction across two rows of the sub pixels 104 extending in the Y direction of the first liquid crystal display panel 100 for every one second main pixel 202 of the second liquid crystal display panel 200. For example, as illustrated in FIG. 24, a configuration is possible in which one of the second main pixels 202 of the second liquid crystal display panel 200 corresponds to four (two in the X direction and two in the Y direction) of the first main pixels 102 of the first liquid crystal display panel 100, and the second light blocking pattern 280 (the incline 282) is inclined an amount corresponding to one sub pixel 104 across the two rows of the sub pixels 104 extending in the Y direction and through two of the sub pixels 104.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A liquid crystal display device, comprising:
a first liquid crystal display panel that displays a color image and in which a first main pixel is disposed in a matrix in a predetermined first direction and in a predetermined second direction perpendicular to the predetermined first direction, the first main pixel including a plurality of sub pixels of different colors; and
a second liquid crystal display panel that displays a monochrome image, is positioned on a side, opposite a surface of an observer side, of the first liquid crystal display panel so as to overlap the first liquid crystal display panel, and in which a second main pixel is disposed in a matrix in the predetermined first direction and in the predetermined second direction, wherein
the second liquid crystal display panel includes a scanning wiring extending in a zig-zig in the predetermined first direction, a period of bending points, arranged along the predetermined first direction, of the scanning wiring of the second liquid crystal display panel corresponds to a predetermined number of the sub pixels of the first liquid crystal display panel, and
the predetermined number is greater that a number of colors of the sub pixels arranged in the predetermined first direction in one of the first main pixel of the first liquid crystal display panel, and is not a natural number multiple of the number of colors of the sub pixels repeatedly arranged along the predetermined first direction of the first liquid crystal display panel.

2. The liquid crystal display device according to claim 1, wherein
when the number of colors of the sub pixels arranged in the predetermined first direction in one of the first main pixel of the first liquid crystal display panel, and the number of colors of the sub pixels repeatedly arranged along the predetermined first direction of the first liquid crystal display panel are three, a natural number is n, a real number is m, and the predetermined number is N, $$N=3\times n+m \quad (1)$$

and $$0<m<3 \quad (2)$$

are satisfied.

3. The liquid crystal display device according to claim 1, wherein
when the number of colors of the sub pixels arranged in the predetermined first direction in one of the first main pixel of the first liquid crystal display panel, and the number of colors of the sub pixels repeatedly arranged along the predetermined first direction of the first liquid crystal display panel are four, a natural number is n, a real number is m, and the predetermined number is N, $$N=4\times n+m \quad (3)$$

and $$0<m<3 \quad (4)$$

are satisfied.

4. The liquid crystal display device according to claim 1, wherein
when the number of colors of the sub pixels arranged in the predetermined first direction in one of the first main pixel of the first liquid crystal display panel is two, and the number of colors of the sub pixels repeatedly arranged along the predetermined first direction of the first liquid crystal display panel is four, a natural number is n, a real number is m, and the predetermined number is N, $$N=3\times n+m \quad (5)$$

and $$0<m<3 \quad (6)$$

are satisfied.

5. The liquid crystal display device according to claim 1, wherein when the number of colors of the sub pixels arranged in the predetermined first direction in one of the first main pixel of the first liquid crystal display panel is two, and the number of colors of the sub pixels repeatedly arranged along the predetermined first direction of the first liquid crystal display panel is four, a natural number is n, a real number is m, and the predetermined number is N, $$N=2\times(2\times n+m) \quad (7)$$

and $$0<m<2 \quad (8)$$

are satisfied.

6. The liquid crystal display device according to claim 1, wherein
the first liquid crystal display panel includes a first signal wiring disposed between the sub pixels and extending in the predetermined second direction,
the second liquid crystal display panel includes a first light blocking pattern extending in the predetermined second direction,
the first light blocking pattern is formed from a second signal wiring extending in the predetermined second direction, or from the second signal wiring and a dummy line extending in the predetermined second direction, and
when viewed from a front, the first light blocking pattern is disposed every of a number of the sub pixels, the number being one greater than the number of colors of the sub pixels repeatedly arranged along the predetermined first direction of the first liquid crystal display panel, and overlaps the first signal wiring of the first liquid crystal display panel.

7. The liquid crystal display device according to claim 1, wherein
the second liquid crystal display panel includes a second light blocking pattern extending in the predetermined second direction, and
the second light blocking pattern is formed from a second signal wiring extending in the predetermined second direction, or from the second signal wiring and a dummy line extending in the predetermined second direction and, for every one of the second main pixel, is inclined with respect to the predetermined second direction across two rows of the sub pixels, of the first liquid crystal display panel, that extend in the predetermined second direction and are adjacent in the predetermined first direction.

8. The liquid crystal display device according to claim 1, wherein the bending points of the scanning wiring of the second liquid crystal display panel are positioned in the second main pixel of the second liquid crystal display panel.

9. The liquid crystal display device according to claim 1, wherein the second main pixel of the second liquid crystal display panel has a shape that is bent along the scanning wiring of the second liquid crystal display panel.

* * * * *